(12) United States Patent
Kanda et al.

(10) Patent No.: US 8,781,233 B2
(45) Date of Patent: Jul. 15, 2014

(54) IMAGE PROCESSING APPARATUS, METHOD OF PROCESSING IMAGE, AND COMPUTER-READABLE RECORDING MEDIUM

(75) Inventors: Yamato Kanda, Hino (JP); Makoto Kitamura, Hachioji (JP); Takehiro Matsuda, Hachioji (JP); Takashi Kono, Tachikawa (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 352 days.

(21) Appl. No.: 13/176,233

(22) Filed: Jul. 5, 2011

(65) Prior Publication Data
US 2012/0002879 A1  Jan. 5, 2012

(30) Foreign Application Priority Data

Jul. 5, 2010  (JP) ................. 2010-153355

(51) Int. Cl.
  *G06K 9/46*  (2006.01)
  *G06K 9/66*  (2006.01)
(52) U.S. Cl.
  USPC ........................ 382/195; 382/131; 382/134
(58) Field of Classification Search
  USPC .................. 382/128, 131, 134, 195; 600/109
  See application file for complete search history.

(56) References Cited

U.S. PATENT DOCUMENTS

| | | | | |
|---|---|---|---|---|
| 6,665,439 | B1 * | 12/2003 | Takahashi | 382/199 |
| 8,005,279 | B2 * | 8/2011 | Yagi et al. | 382/128 |
| 8,437,520 | B2 * | 5/2013 | Manabe et al. | 382/128 |
| 2007/0019854 | A1 * | 1/2007 | Gholap et al. | 382/133 |
| 2008/0107315 | A1 * | 5/2008 | Kimmel et al. | 382/128 |
| 2009/0220133 | A1 | 9/2009 | Sawa et al. | |
| 2011/0069876 | A1 * | 3/2011 | Kanda | 382/134 |
| 2011/0228994 | A1 * | 9/2011 | Tanaka et al. | 382/128 |
| 2012/0002879 | A1 * | 1/2012 | Kanda et al. | 382/195 |
| 2012/0033862 | A1 * | 2/2012 | Wang et al. | 382/128 |
| 2012/0078106 | A1 * | 3/2012 | Dentinger et al. | 600/454 |

FOREIGN PATENT DOCUMENTS

JP  2007-236629  9/2007

OTHER PUBLICATIONS

Wang, G. et al., "Three-dimensional Reconstruction of Endoscope Images by a Fast Shape from Shading Method", Measurement Science and Technology, Dec. 1, 2009, vol. 20, No. 12, 125801 (9 pages).
Kwoh, C.K. et al., "Automated Endoscope Navigation and Advisory System from Medical Imaging", Proceedings of SPIE, Jan. 1, 1999, vol. 3660, pp. 214-224.
Prados, E. et al., "A Unifying and Rigorous Shape from Shading Method Adapted to Realistic Data and Applications", Journal of Mathematical Imaging and Vision, Aug. 29, 2006, vol. 25, No. 3, pp. 307-328.

(Continued)

*Primary Examiner* — Gregory M Desire
(74) *Attorney, Agent, or Firm* — Scully, Scott, Murphy & Presser, P.C.

(57) ABSTRACT

An image processing apparatus includes: an area extracting unit that extracts a candidate area of a classification target area in which a pixel value does not correspond to a three-dimensional shape of an imaging target based on pixel values of an intraluminal image acquired by imaging the inside of a lumen or information of a change in pixel values of peripheral pixels; and an area classifying unit that classifies the classification target area out of the candidate area based on the pixel values of the inside of the candidate area, a boundary portion of the candidate area, or a periphery portion of the candidate area.

22 Claims, 23 Drawing Sheets

(56) References Cited

OTHER PUBLICATIONS

Vogel, O. et al., "Making Shape from Shading Work for Real-World Images", Pattern Recognition: 31$^{st}$ DAGM Symposium, Jena, Germany, Sep. 9-11, 2009, Proceedings, pp. 191-200.

Sauvola, J. et al., "Adaptive Document Image Binarization", Pattern Recognition, Feb. 1, 2000, vol. 33, No. 2, pp. 225-236.

European Search Report dated Nov. 29, 2011 from corresponding European Patent Application No. EP 11 00 5448.3.

\* cited by examiner a: MIRROR REFLECTION PORTION b: WHITE LESION c: BLOOD VESSEL d: RED OR BLACK LESION e: DIFFERENCE IN LEVEL OF MUCOUS MEMBRANE f: MUCOUS MEMBRANE GROOVE a: MIRROR REFLECTION PORTION b: BLOOD VESSEL c: COLOR-CHANGED LESION (RED LESION)

d: SHAPE-CHANGED LESION e: DIFFERENCE IN LEVEL OF MUCOUS MEMBRANE f: MUCOUS MEMBRANE GROOVE

FIG.17
(a)
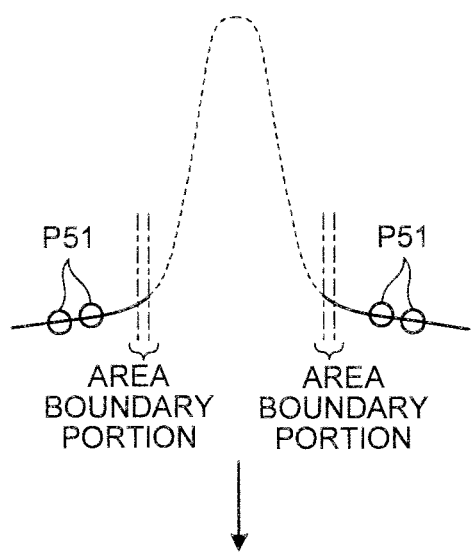
(b)
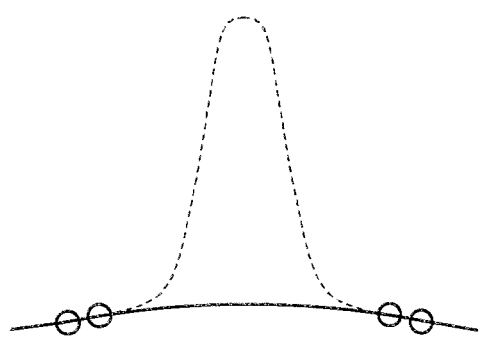

a: MIRROR REFLECTION PORTION d: RED OR BLACK LESION b: WHITE LESION e: DIFFERENCE IN LEVEL OF MUCOUS MEMBRANE c: BLOOD VESSEL f: MUCOUS MEMBRANE GROOVE

US 8,781,233 B2

IMAGE PROCESSING APPARATUS, METHOD OF PROCESSING IMAGE, AND COMPUTER-READABLE RECORDING MEDIUM

CROSS-REFERENCE TO RELATED APPLICATIONS

This application is based upon and claims the benefit of priority from Japanese Patent Application No. 2010-153355, filed on Jul. 5, 2010, the entire contents of which are incorporated herein by reference.

BACKGROUND OF THE INVENTION

1. Field of the Invention

The present invention relates to an image processing apparatus, a method of processing an image, and a computer-readable recording medium for processing an intraluminal image acquired by imaging the inside of a lumen.

2. Description of the Related Art

In Japanese Laid-open Patent Publication No. 2007-236629, a method is disclosed in which the three-dimensional image of a body tissue is estimated based on an intraluminal image (endoscopic image), and a lesion site having a protruded shape such as a polyp is detected based on shape feature data such as curvature at each position of the estimated three-dimensional shape. Here, in order to estimate the three-dimensional shape, while pixel values corresponding to the three-dimensional shape of the imaging target need to be acquired from the intraluminal image, in Japanese Laid-open Patent Publication No. 2007-236629 described above, luminance information of the intraluminal image is regarded as pixel values corresponding to the three-dimensional image, and the three-dimensional shape is estimated by performing a geometric conversion process based on the pixel values.

SUMMARY OF THE INVENTION

An image processing apparatus according to an aspect of the present invention includes an area extracting unit that extracts a candidate area of a classification target area in which a pixel value does not correspond to a three-dimensional shape of an imaging target based on pixel values of an intraluminal image acquired by imaging the inside of a lumen or information of a change in pixel values of peripheral pixels; and an area classifying unit that classifies the classification target area out of the candidate area based on the pixel values of the inside of the candidate area, a boundary portion of the candidate area, or a periphery portion of the candidate area.

A method of processing an image according to another aspect of the present invention includes extracting a candidate area of a classification target area in which a pixel value does not correspond to a three-dimensional shape of an imaging target based on pixel values of an intraluminal image acquired by imaging the inside of a lumen or information of a change in pixel values of peripheral pixels; and classifying the classification target area out of the candidate area based on the pixel values of the inside of the candidate area, a boundary portion of the candidate area, or a periphery portion of the candidate area.

An image processing program according to the present invention causes a computer to perform: extracting a candidate area of a classification target area in which a pixel value does not correspond to a three-dimensional shape of an imaging target based on pixel values of an intraluminal image acquired by imaging the inside of a lumen or information of a change in pixel values of peripheral pixels; and classifying the classification target area out of the candidate area based on the pixel values of the inside of the candidate area, a boundary portion of the candidate area, or a periphery portion of the candidate area.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a conceptual diagram illustrating pixel value complementing using function approximation;

DETAILED DESCRIPTION OF THE PREFERRED EMBODIMENTS

Figure 1:
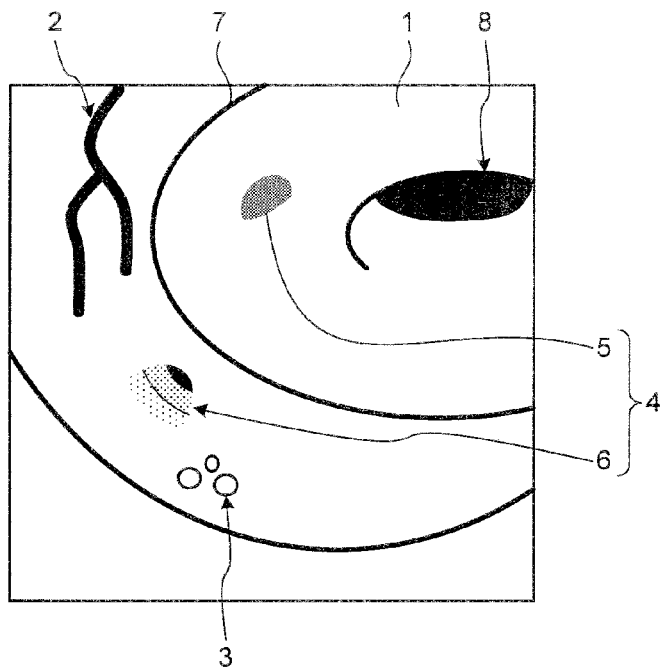
FIG. 1 is a schematic diagram of an intraluminal image that is imaged by an endoscope.

Hereinafter, preferred embodiments of the present invention will be described in detail with reference to the accompanying drawings. In this embodiment, an image processing apparatus that processes an intraluminal image (image of the inside of a gastrointestinal tract) that is imaged by an endoscope will be described. The endoscope is a medical device that is used for observing the inside of a lumen such as a gastrointestinal tract. The endoscope is a system device that is configured by: an insertion unit that has an illumination system, an optical system, an imaging system, and the like for imaging an object being built in the distal end thereof and is inserted into the inside of a lumen, a casing unit that is connected to the insertion unit and has a light source, an image processing apparatus, and the like being built therein; a display unit that displays the imaged intraluminal image; and the like. However, the present invention is not limited to this embodiment. Like reference numerals in the drawings denote like elements.

Figure 2:
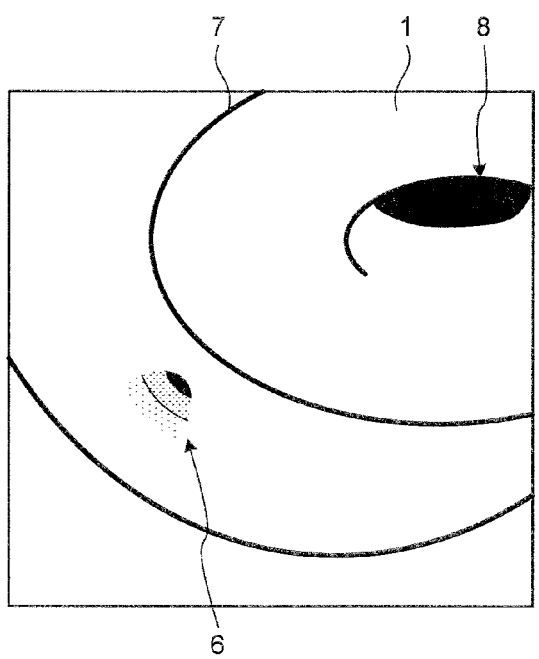
FIG. 2 is a schematic diagram of three-dimensional pixel value information of the intraluminal image illustrated in FIG. 1.

FIG. 1 is a schematic diagram of an intraluminal image that is imaged by an endoscope. FIG. 2 is a schematic diagram of three-dimensional pixel value information of the intraluminal image illustrated in FIG. 1. As illustrated in FIG. 1, basically, a mucous membrane 1 of an inner wall of a gastrointestinal tract is reflected on the intraluminal image, and a blood vessel 2 located under the surface layer of the mucous membrane, a mirror reflection portion 3, a lesion 4, and the like are also reflected on the intraluminal image at times. As such lesions 4, there are a color-changed lesion 5 such as redness in which only the color changes with little change in the surface of the mucous membrane and a shape-changed lesion 6 such as a polyp in which there is a change in the shape of the surface of the mucous membrane. In addition, on the intraluminal image, a mucous membrane undulation 7 called a difference in level of the mucous membrane that is generated due to folding, winding, or the like of the structure of the mucous membrane or a mucous membrane groove is reflected, and the inside of the lumen (a mucous membrane located at a position far from the imaging system) is reflected as well as a dark portion area 8. Here, for the shape-changed lesion 6, the mucous membrane undulation 7 such as the difference in level of the mucous membrane or the mucous membrane groove, in addition to the mucous membrane 1 and the dark portion area 8, the change in the pixel value corresponds to a three-dimensional shape. In contrast to this, the blood vessel 2 located under the surface layer of the mucous membrane, the mirror reflection portion 3, and the color-changed lesion 5 are portions which are influenced much by light absorption, mirror reflection, or the like, and for which the change in the pixel value does not correspond to a three-dimensional shape. Specifically, as described above, the luminance value at the blood vessel 2 decreases due to absorption of illumination light in blood. In addition, similarly, the luminance value at the color-changed lesion 5 decreases as well due to absorption of light in the blood. On the other hand, the luminance value at the mirror reflection portion 3 increases regardless of the three-dimensional shape of a body tissue. In addition, generally, the intraluminal image that is imaged by an endoscope is a color image that has pixel values for wavelength components of R (red), G (green), and B (blue) at each pixel position.

The image processing apparatus according to this embodiment calculates pixel values (hereinafter, referred to as "three-dimensional pixel value information") corresponding to the three-dimensional shape of the mucous membrane as a body tissue from an intraluminal image by processing the intraluminal image described as above. First, areas of the blood vessel 2, the mirror reflection portion 3, and the color-changed lesion 5 for which the pixel values do not correspond to a three-dimensional shape of the imaging target (body tissue) are classified. Then, the classified areas of the blood vessel 2, the mirror reflection portion 3, and the color-changed lesion 5 are complemented based on the peripheral pixel values thereof, whereby the three-dimensional pixel values are calculated. In addition, for the areas of any other mucous membrane 1, the shape-changed lesion 6, the mucous membrane undulation 7, and the dark portion area 8, three-dimensional pixel values are calculated based on the pixel values, whereby the three-dimensional pixel value information as illustrated in FIG. 2 is calculated.

First Embodiment

Figure 3:
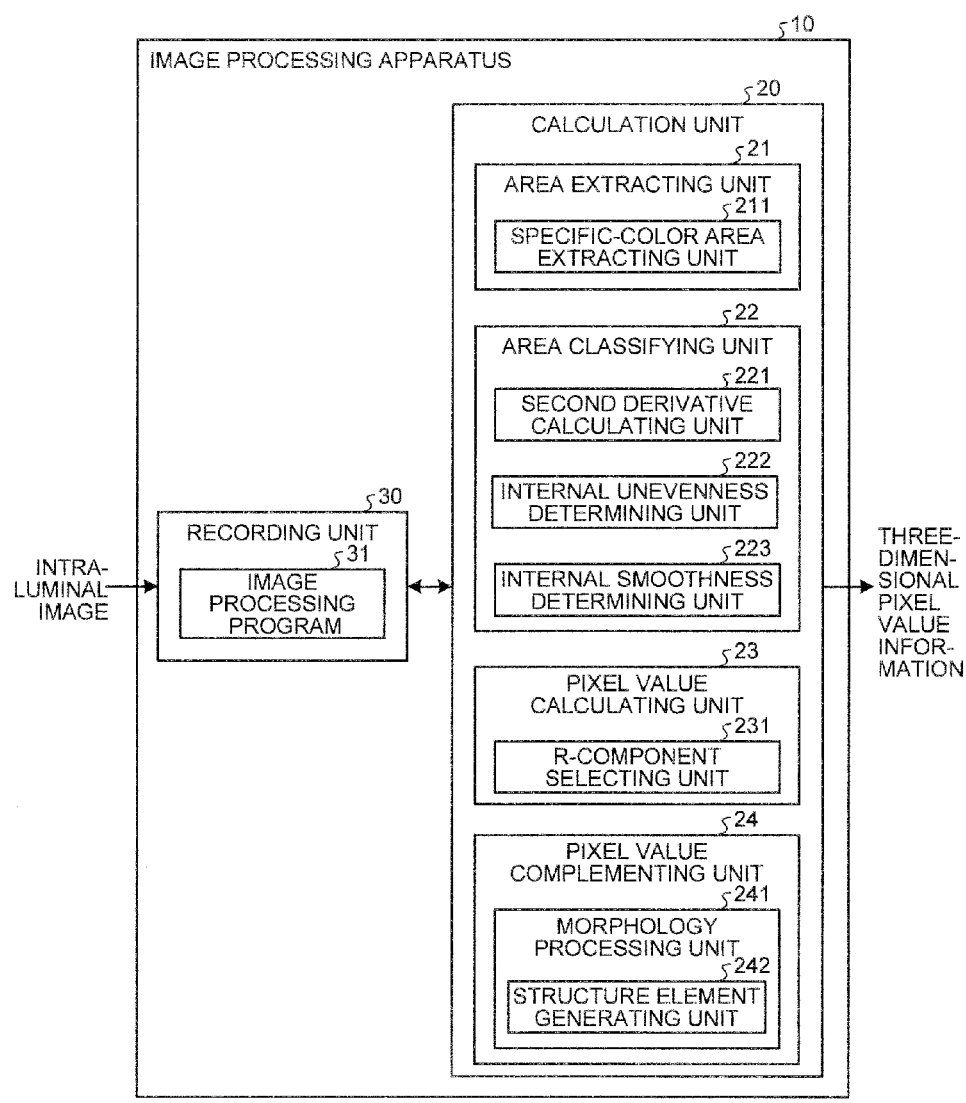
FIG. 3 is a schematic block diagram illustrating the main configuration of an image processing apparatus according to a first embodiment.

First, the configuration of an image processing apparatus 10 according to the first embodiment will be described. FIG. 3 is a schematic block diagram illustrating the main configuration of the image processing apparatus 10 according to the first embodiment. As illustrated in FIG. 3, the image processing apparatus 10 according to the first embodiment includes a calculation unit 20 and a recording unit 30. This image processing apparatus 10, for example, is built in the above-described endoscope and outputs calculated three-dimensional pixel value information by receiving an intraluminal image that is imaged by the endoscope as an input and processing the intraluminal image.

The calculation unit 20 is realized by hardware such as a CPU and performs various calculation processes used for calculating the three-dimensional pixel value information based on the intraluminal image. This calculation unit 20 includes an area extracting unit 21, an area classifying unit 22, a pixel-value calculating unit 23, and a pixel-value complementing unit 24.

The area extracting unit 21 includes a specific-color area extracting unit 211. This area extracting unit 21 is a functional unit that is used for extracting candidate areas (classification-target candidate area) of classification target areas from an intraluminal image. In the first embodiment, the specific-color area extracting unit 211 extracts areas of specific colors as classification-target candidate areas based on the pixel values.

The area classifying unit 22 classifies areas of a blood vessel, a mirror reflection portion, and a color-changed lesion out of the classification-target candidate areas as classification target areas based on the unevenness information and the smoothness of the curved shape of each classification-target candidate area that is represented by the pixel values within the classification-target candidate area. This area classifying unit 22 includes a second derivative calculating unit 221, an internal unevenness determining unit 222, and an internal smoothness determining unit 223. The second derivative calculating unit 221 calculates a second derivative value by applying a second derivative filter to the pixels located within the classification-target candidate area. The internal unevenness determining unit 222 determines the unevenness of the curved shape (change in the pixel value) of the classification-target candidate area based on the sign of the second derivative value of the pixels within the classification-target candidate area. The internal smoothness determining unit 223 determines the smoothness of the curved shape (change in the pixel value) of the classification-target candidate area based on the absolute value of the second derivative value of the pixels within the classification-target candidate area.

The pixel-value calculating unit 23 calculates pixel values of a specific wavelength component that is specified in accordance with the degree of absorption or scattering inside a body tissue as three-dimensional pixel values for an area other than the classification target areas. This pixel-value calculating unit 23 includes an R-component selecting unit 231 that selects pixel values of an R component from an area other than the classification target areas with the R component set as the specific wavelength component.

The pixel-value complementing unit 24 complements the three-dimensional pixel values of the areas of the blood vessel, the mirror reflection portion, and the color-changed lesion as the classification target areas based on the pixel value of the specific-wavelength component of the area other than the classification target areas. This pixel-value complementing unit 24 includes a morphology processing unit 241 that performs a morphology process based on the pixel value of the specific-wavelength component of the periphery of the classification target area. The morphology processing unit 241 includes a structure element generating unit 242 that generates a structure element used in the morphology process based on feature data of the classification target area.

The recording unit 30 is realized by: various memories such as a ROM as a flash memory for which update recording can be performed or the like and a RAM; a hard disk that is built in or is connected through a communication terminal; various types of recording medium such as a CD-ROM; a reading device thereof; and the like. In this recording unit 30, a program used for realizing various functions included in the image processing apparatus 10 by operating the image processing apparatus 10, data used during the execution of the program, and the like are recorded. For example, in the recording unit 30, image data of an intraluminal image that is imaged by the endoscope and is input to the image processing apparatus 10 is recorded. In addition, in the recording unit 30, an image processing program 31 that is used for calculating the three-dimensional pixel value information base on the intraluminal image is recorded.

Figure 4:
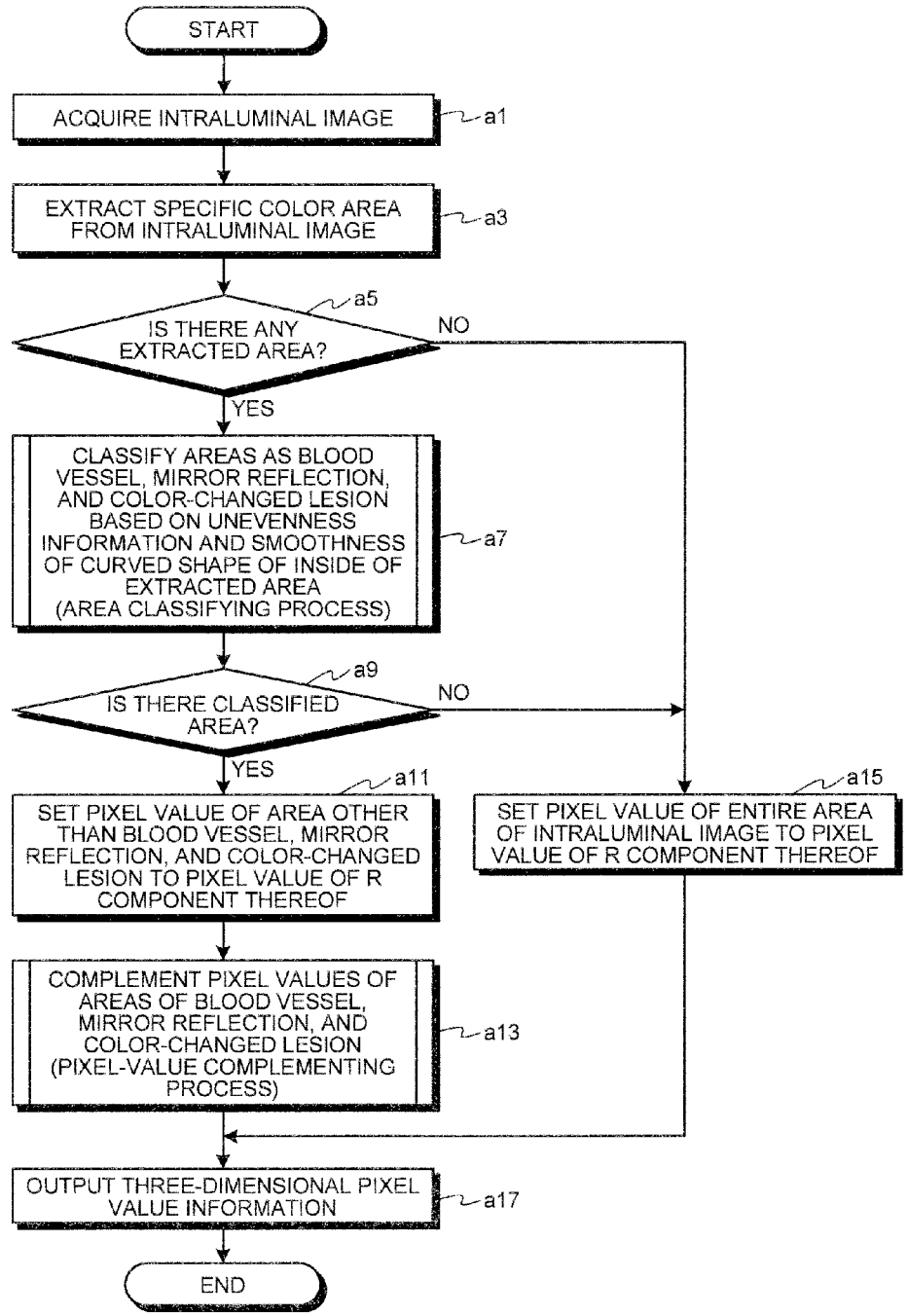
FIG. 4 is the entire flowchart illustrating the processing sequence performed by an image processing apparatus according to the first embodiment.

Next, the detailed processing sequence performed by the image processing apparatus 10 according to the first embodiment will be described. FIG. 4 is an entire flowchart illustrating the processing sequence performed by the image processing apparatus 10 according to the first embodiment. The process described here is realized by executing the image processing program 31 recorded in the recording unit 30 by using the calculation unit 20.

As illustrated in FIG. 4, first, the calculation unit 20 acquires an intraluminal image as a processing target (Step a1). Through this process, the intraluminal image that is imaged, for example, by an endoscope and is recorded in the recording unit 30 is read out so as to be acquired.

Next, the specific-color area extracting unit 211 of the area extracting unit 21 extracts areas of specific colors from the intraluminal image as the processing target as classification-target candidate areas based on the pixel values (Step a3). Each area of the blood vessel, the mirror reflection portion, or the color-changed lesion represents a specific color. For example, the blood vessel represents red or red-violet, the mirror reflection portion represents white, and the color-changed lesion represents red, black, white, or the like. According to the first embodiment, by extracting areas of specific colors, classification-target candidate areas as candidates for a blood vessel, a mirror reflection portion, or a color-changed lesion are extracted.

As methods of extracting specific-color areas, there are various methods. Here, a method is used in which a distribution of previous sample data is approximated as a probability model, and the specific-color areas are extracted based on determinations using the probability model. Specifically, a plurality of pixels belonging to each category of the blood vessel, the mirror reflection, or the color-changed lesion is sampled in advance, and color feature data of the pixels is acquired. Here, the color feature data is a pixel value of each component of R, G or B, a value that is secondarily calculated through a known conversion process based on the pixel values, a color difference (YCbCr conversion), hue, saturation (HSI conversion), a color ratio (G/R or B/G), or the like. Next, a feature vector Fn=(fn_1, fn_2, . . . , fn_k)$^t$ that is formed from color feature data of the sampled pixel is calculated. Here, fn_j denotes the j-th color feature data of the n-th sampled pixel, and k denotes the number of the color feature data values. Then, an average vector p and a variance-covariance matrix Z are acquired based on this feature vector Fn by using the following Equation (1) and are recorded in the recording unit 30. In the equation, ND is the number of sampled data values.

$$\mu = \frac{1}{ND}\sum_{n=1}^{ND} Fn, \quad Z = \frac{1}{ND}\sum_{n=1}^{ND}(Fn-\mu)(Fn-\mu)^t \qquad (1)$$

Actually, in Step a3, first, a determination index P(x) that indicates whether or not each pixel is a specific color represented by each category area is calculated for each category by using the following Equation (2) based on the feature data x=(x_1, x_2, . . . , x_k)$^t$ that is formed from the color feature data of each pixel of the intraluminal image as the processing target and the average vector μ and the variance-covariance matrix Z of each category that are acquired and recorded in the recording unit 30 in advance. Here, |Z| is a matrix equation of Z, and Z$^{-1}$ is an inverse matrix of Z.

$$P(x) = \frac{1}{(2\pi)^{k/2} \times |Z|^{1/2}} \exp\left\{(x-\mu)^t \times -\frac{1}{2}Z^{-1} \times (x-\mu)\right\} \qquad (2)$$

Thereafter, to a pixel for which the maximum value of the determination index P(x) is a predetermined threshold value or more, an integer value (label value) corresponding to a category representing the maximum value is set, and, to a pixel for which the maximum value of the determination index P(x) is the threshold value or less, "0" is set, thereby generating a candidate area image.

As above, in this example, although an extraction method using the probability model is illustrated, the method is not particularly limited, as long as the areas of specific colors corresponding to the areas of the blood vessel, the mirror reflection portion, the color-changed lesion can be extracted by using it. As a method other than that described in this example, a method may be used in which a color feature vector, for example, representing a specific color is set, and an area of the specific color inside the intraluminal image is extracted based on a distance between the set vector and a feature vector data formed from color feature data of a pixel as a determination target inside a feature space (a space in which a feature axis representing the size relationship of the feature data extends). Alternatively, a method may be used in which a range representing a specific color is set in a feature space, and an area of the specific color inside the intraluminal image is extracted based on the positional relationship between the set range and a feature vector that is formed from color feature data of a pixel as a determination target. Furthermore, the method is not limited to a method in which the area of the specific color is extracted by using the color feature data in units of a pixel is not limited, and a method may be used in which the inside of an image is divided into small areas, and then the area of the specific color is extracted by using the color feature data in units of a small area.

Next, the calculation unit 20 determines whether or not there is an area extracted as an area of the specific color (a classification-target candidate area). This can be determined by determining whether or not there is a pixel having a positive value as the pixel value in the candidate area image. In a case where there is no extracted area (No in Step a5), the process proceeds to Step a15 to be described later.

On the other hand, in a case where there is an extracted area (classification-target candidate area) (Yes in Step a5), the area classifying unit 22 classifies the areas of the blood vessel, the mirror reflection portion, and the color-changed lesion as the classification target areas out of the classification-target candidate area based on the unevenness information and the smoothness of the curved shapes of the classification-target candidate areas by performing an area classifying process (Step a7). There is a possibility that a difference in level of the mucous membrane, a mucous membrane groove, or the like other than the blood vessel, the mirror reflection portion, and the color-changed lesion is included in the area of the specific color that is extracted based on the color feature data in Step a3. The reason for this is that this may represent a color that is close to red or black at times. Thus, in the area classifying process according to the first embodiment, both areas are classified based on the unevenness information and the smoothness of the curved shape of the classification-target candidate area that is represented by pixel values of the inside of the classification-target candidate area.

Before the classification, pixels having the same pixel value within the candidate area image need to be connected to each other so as to be recognized as one area. This can be realized by performing a known labeling process (reference: "Digital Image Processing", CG-ARTS Society, 181P, *Labeling*).

Figure 5:
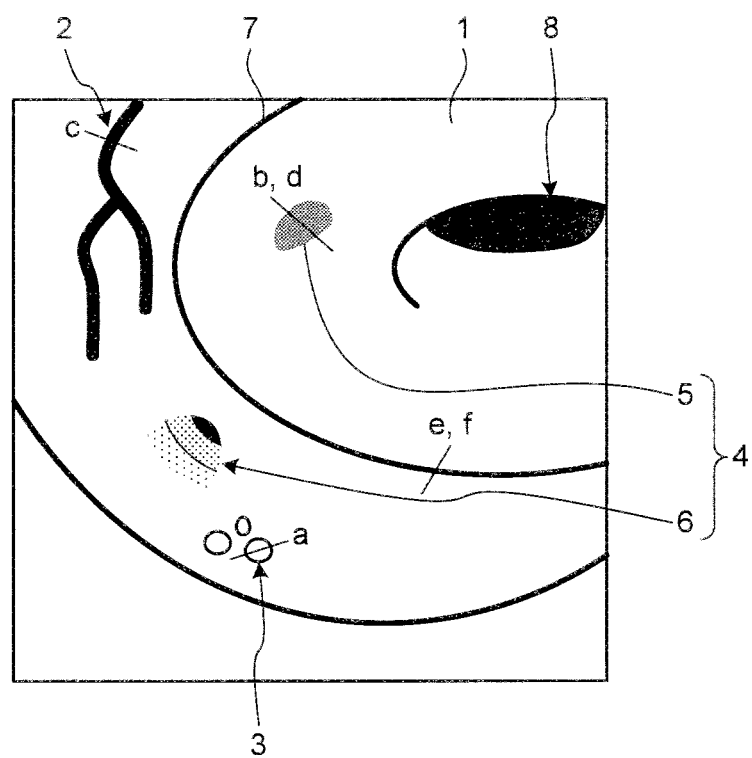
FIG. 5 is a diagram illustrating the cross-section directions of a blood vessel, a mirror reflection portion, a color-changed lesion, and a mucous membrane undulation.
Figure 6A:
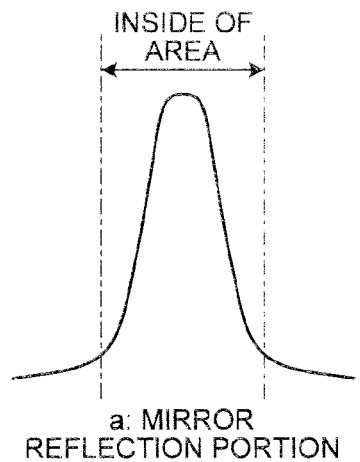
FIG. 6A is a schematic diagram illustrating a change in the pixel value within the area of the mirror reflection portion along cross-section direction a illustrated in FIG. 5.
Figure 6B:
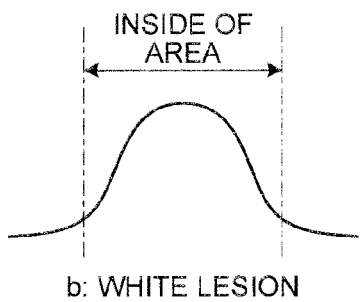
FIG. 6B is a schematic diagram illustrating a change in the pixel value within the area of a white lesion along cross-section direction b illustrated in FIG. 5.
Figure 6C:
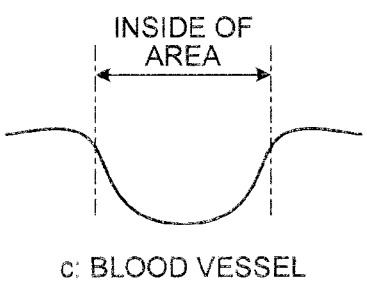
FIG. 6C is a schematic diagram illustrating a change in the pixel value within the area of a blood vessel along cross-section direction c illustrated in FIG. 5.
Figure 6D:
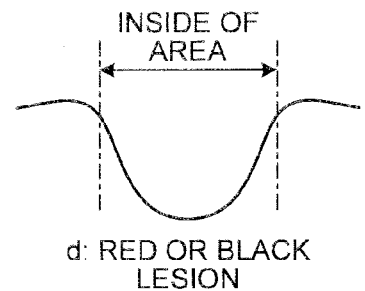
FIG. 6D is a schematic diagram illustrating a change in the pixel value within the area of a red or black lesion along cross-section direction d illustrated in FIG. 5.
Figure 6E:
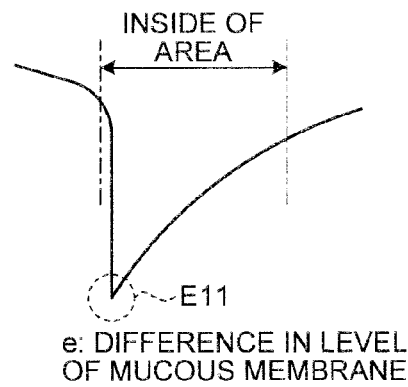
FIG. 6E is a schematic diagram illustrating a change in the pixel value within the area of a difference in level of the mucous membrane along cross-section direction e illustrated in FIG. 5.
Figure 6F:
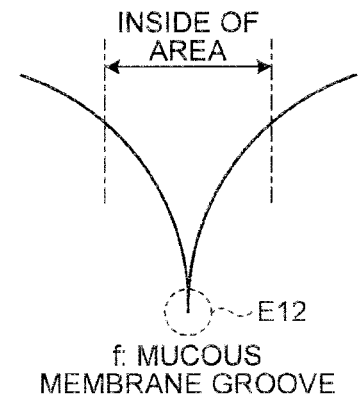
FIG. 6F is a schematic diagram illustrating a change in the pixel value within the area of a mucous membrane groove along cross-section direction f illustrated in FIG. 5.

Here, before the detailed processing sequence of the area classifying process is described, the features of the inside of the area of each category area of the blood vessel, the mirror reflection portion, the color-changed lesion, the difference in level of the mucous membrane, and the mucous membrane groove included in the area of the specific color will be described. FIG. 5 is a diagram illustrating cross-section directions a to f of category areas of a blood vessel 2, a mirror reflection portion 3, a color-changed lesion 5, and a mucous membrane undulation 7. FIG. 6A is a schematic diagram illustrating a change in the pixel value within the area of the mirror reflection portion 3 along cross-section direction a illustrated in FIG. 5. FIG. 6B is a schematic diagram illustrating a change in the pixel value within the area of a white lesion as the color-changed lesion 5 illustrated in FIG. 5 along cross-section direction b. FIG. 6C is a schematic diagram illustrating a change in the pixel value within the area of the blood vessel 2 along cross-section direction c illustrated in FIG. 5. FIG. 6D is a schematic diagram illustrating a change in the pixel value within the area along cross-section direction d in a case where the color-change lesion 5 illustrated in FIG. 5 is a red or black lesion. FIG. 6E is a schematic diagram illustrating a change in the pixel value within the area of a difference in level of the mucous membrane as the mucous membrane undulation 7 illustrated in FIG. 5 along cross-section direction e. FIG. 6F is a schematic diagram illustrating a change in the pixel value within the area of a mucous membrane groove as the mucous membrane undulation 7 illustrated in FIG. 5 along cross-section direction f.

As described above, the pixel values of the intraluminal image are composed of values of the components R, G, and B. Although there are differences in the scale between the values, the tendencies of the changes are similar to each other. Here, both change in the pixel value of the mirror reflection portion 3 along cross-section direction a illustrated in FIG. 5 and the change in the pixel value of the white lesion (5) along cross-section direction b, as illustrated in FIGS. 6A and 6B, represent convex shapes in which the pixel value of the inside of the area is greater than that of the periphery. On the other hand, the change in the pixel value of the blood vessel 2 along cross-section c, the change in the pixel value of the red or black lesion (5) along cross-section direction d, and the change in the pixel value of the difference in level (7) of the mucous membrane along cross-section direction e illustrated in FIG. 5, as illustrated in FIGS. 6C, 6D, 6E, and 6F, represent concave shapes in which the pixel value is less than that of the periphery. In addition, since the change in the pixel value of the blood vessel 2 or the red or black lesion (5) is an integral target, as illustrated in FIGS. 6C and 6D, the pixel value of the inside of the area smoothly change. In contrast to this, since the difference in level (7) of the mucous membrane along cross-section direction e illustrated in FIG. 5 includes a boundary of another mucous membrane inside the area, the change in the pixel value, as illustrated by being surrounded by a broken line in FIG. 6E, includes a portion E11 in which the pixel value does not smoothly change. Similarly, the mucous membrane groove (7) along cross-section direction f illustrated in FIG. 5, as illustrated by being surrounded by a broken line in FIG. 6F, includes a portion E12 in which the pixel value does not smoothly change. In the area classifying process according to the first embodiment classifies the areas of the blood vessel, the mirror reflection portion, and the color-changed lesion as classification target areas out of the classification-target candidate areas based on such features.

Figure 7:
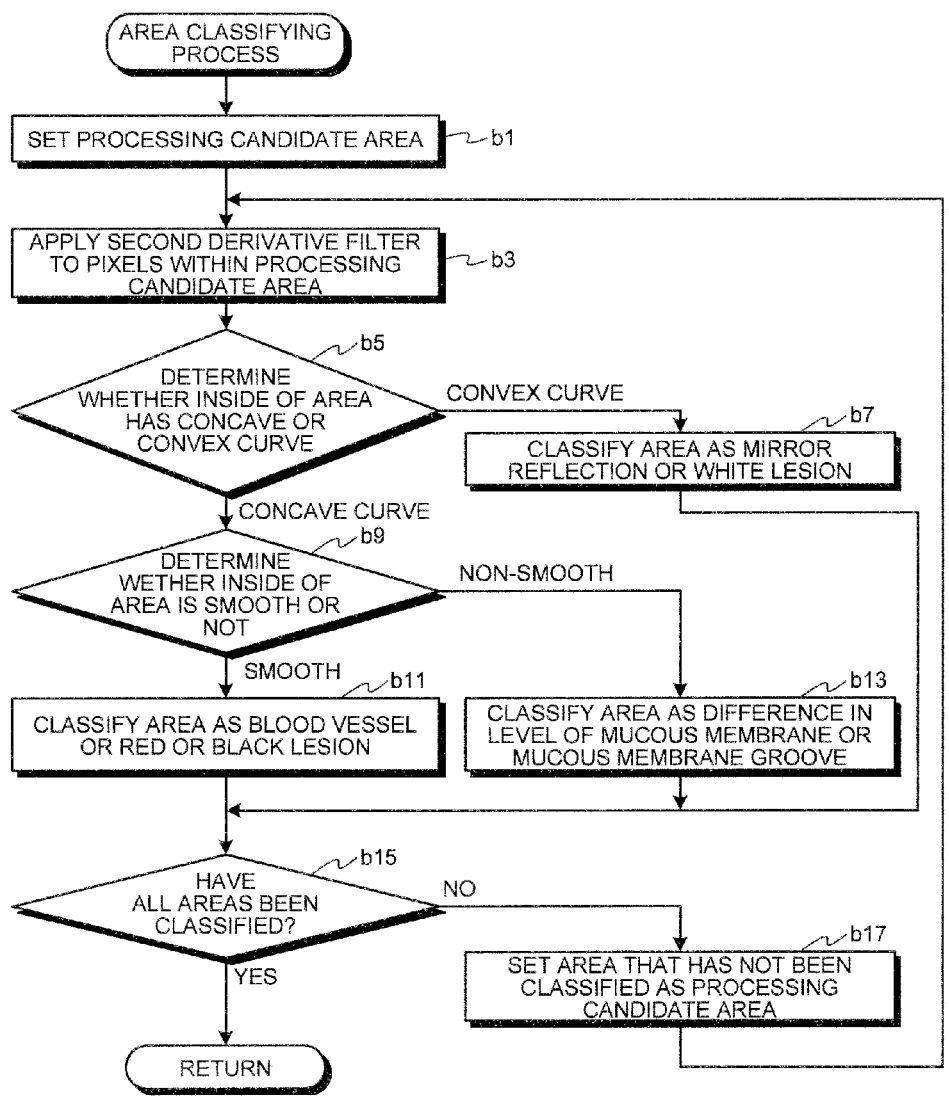
FIG. 7 is a flowchart illustrating the detailed processing sequence of an area classifying process according to a first embodiment.

In the actual area classifying process, the classification-target candidate areas are sequentially set as processing targets, and it is sequentially determined whether or not each classification-target candidate area is a classification-target area. FIG. 7 is a flowchart illustrating the detailed processing sequence of an area classifying process according to the first embodiment. As illustrated in FIG. 7, first, the area classifying unit 22 sets classification-target candidate areas (hereinafter, the classification-target candidate areas as the processing targets are referred to as "processing candidate areas") as processing targets (Step b1).

Next, the second derivative calculating unit 221 calculates a second derivative value at each pixel by applying a known second derivative filter (reference: "Digital Image Processing", CG-ARTS Society, 118P, *Second derivative Filter*) to the pixel value of any one of the components R, G, and B of the pixel located within a processing candidate area in Step b3. At this time, in order to reduce the influence of a noise, for example, a Laplacian of Gaussian (LOG) filter that is a second derivative filter accompanying smoothing is used.

Next, the internal unevenness determining unit 222 determines the unevenness of the curved shape (change in the pixel value) of the processing candidate area based on the pixel values within the processing candidate area (Step b5). The second derivative filter basically has a structure in which a difference between the average value of the peripheral pixels and the value of the center pixel or the average value of pixels located near the center pixels is acquired, and accordingly, the sign thereof is inverted in accordance with the unevenness of the change in the pixel value. Thus, the determination of the unevenness of the curved shape is performed by determining the unevenness of the change in the pixel value based on the sign of the average value of the second derivative values of the pixels within the processing candidate area. In a case where the result of the unevenness determination is a convexity, the process proceeds to Step b7, and the area classifying unit 22 classifies the processing candidate area as the mirror reflection portion or the white color lesion. Alternatively, the determination of the unevenness of the curved shape may be performed by comparing the numbers of the positive signs and the negative signs of the second derivative values of the pixels within the processing candidate area. Furthermore, the unevenness determination may be performed based on the sign of a maximum value of the second derivative values.

On the other hand, in a case where the result of the unevenness determination is a concavity, the process proceeds to Step b9, and the internal smoothness determining unit 223 determines the smoothness of the curved shape (change in the pixel value) of the processing candidate area based on the pixel values within the processing candidate area. For determining the smoothness, a second derivative value is used as well. In a case where the change in the pixel value is smooth, a difference between values of the peripheral pixel and the center pixel is small, and accordingly, the absolute value of the second derivative value is small. Accordingly, the smoothness is determined by determining whether or not the average value of the absolute values of the second derivative values within the processing candidate area is a threshold value set in advance or less. The determining of the smoothness is not limited to being based on the average value of the absolute values of the second derivative values within the processing candidate area. Thus, it may be configured such that a maximum value of the second derivative values within the processing candidate area is calculated, and threshold value processing is performed for the maximum value.

In a case where the change in the pixel value within the processing candidate area is determined to be smooth in Step b9, the process proceeds to Step b11, and the area classifying unit 22 classifies the processing candidate area as a blood vessel or a red or black lesion. On the other hand, in a case where the change is determined not to be smooth in Step b9, the process proceeds to Step b13, and the area classifying unit 22 classifies the processing candidate area as a difference in level of a mucous membrane or a mucous membrane groove.

Thereafter, the area classifying unit 22 determines whether all the classification-target candidate areas have been classified. In a case where all the classification-target candidate areas have not been classified (No in Step b15), the area classifying unit 22 sets a classification-target candidate area, which has not been classified, as the processing candidate area (Step b17), and performs the process of Steps b3 to b15 again. On the other hand, in a case where all the classification-target candidate areas have been classified (Yes in Step b15), the process is returned to Step a7 illustrated in FIG. 4 and proceeds to Step a9. Consequently, a classification-target area image is generated in which positive values (label values) used for area identification are set to the pixels located in the areas classified as a blood vessel, a mirror reflection portion, or a color-changed lesion that is the classification target area, and "0" is set to pixels located in an area other than the classification target area.

Next, the calculation unit 20 determines whether there is an area classified as a blood vessel, a mirror reflection portion, or a color-changed lesion that is the classification target area. This can be determined by determining whether or not there is a pixel having a positive value as the pixel value in the classification-target area image. In a case where there is no area classified as a blood vessel, a mirror reflection portion, or a color-changed lesion (No in Step a9), the process proceeds to Step a15 to be described later.

On the other hand, there is an area (classification target area) classified as a blood vessel, a mirror reflection portion, or a color-change lesion (Yes in Step a9), the R-component selecting unit 231 of the pixel-value calculating unit 23 selects the pixel value of the R component in an area other than the classification target area, and subsequently, the pixel-value calculating unit 23 sets the pixel value of the selected R component as a three-dimensional pixel value in an area other than the classification target area (Step a11). Here, since the R component is a wavelength component located far from the absorption band of the blood and is a long-wavelength component, it is difficult for the R component to be influenced by absorption or scattering occurring inside a body, and the R component represents a pixel value corresponding to a three-dimensional shape of the body organization. Thus, according to the first embodiment, a specific wavelength component that is specified in accordance with the degree of absorption or scattering inside the body is set as the R component.

In this example, a method is illustrated in which the R component is selected from the intraluminal image of components R, G, and B. However, in a case where an intraluminal image of components cyan (C), magenta (M), and yellow (Y) that are complementary colors of R, G, and B is handled, an R component may be selected after the components C, M, and Y are converted into components R, G, and B.

Next, the pixel-value complementing unit 24 performs a pixel-value complementing process, thereby complementing the pixel values in the areas of a blood vessel, a mirror reflection portion, and a color-changed lesion that are the classification target areas (Step a13). In the first embodiment, the pixel-value complementing process is performed by using a morphology process. Through the process performed here, a three-dimensional pixel value in the classification target area is complemented based on the pixel value of the specific wavelength component calculated as a three-dimensional pixel value of an area (to be specific, a periphery area of the classification target area) other than the classification target area in the previous stage of Step a11.

Figure 8:
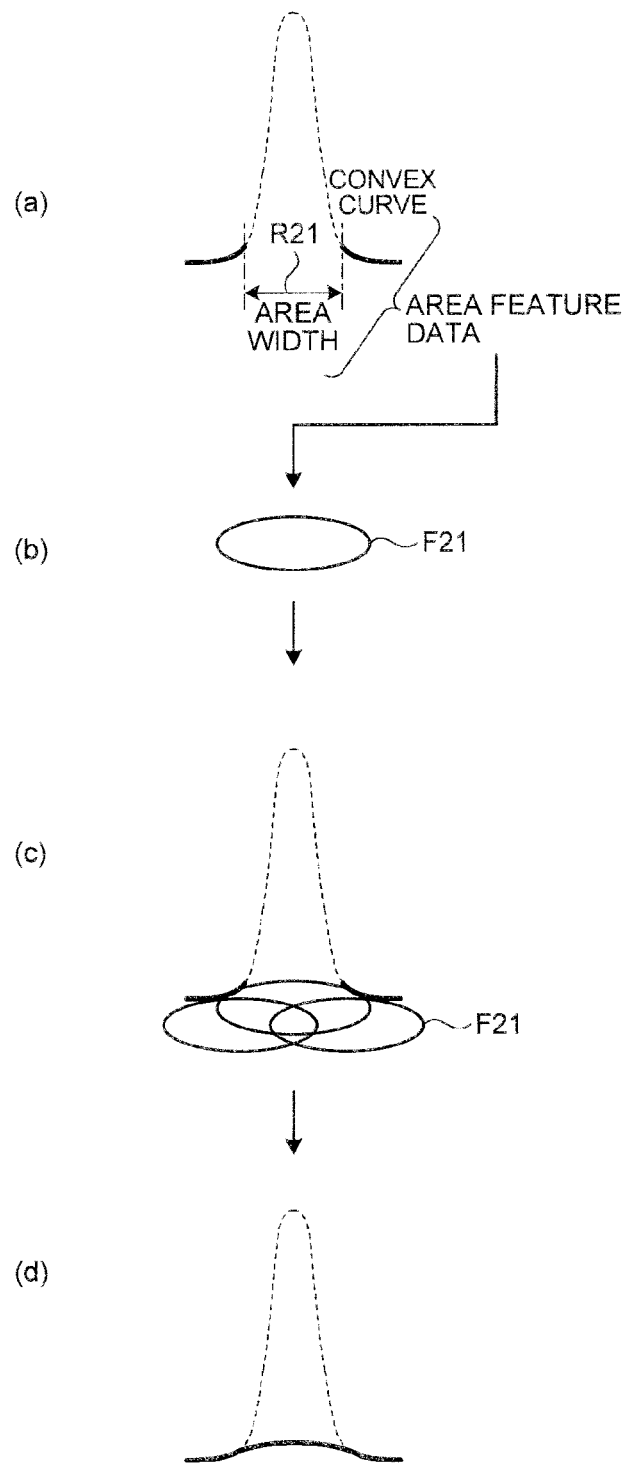
FIG. 8 is a conceptual diagram illustrating pixel value complementing using a morphology opening process.
Figure 9:
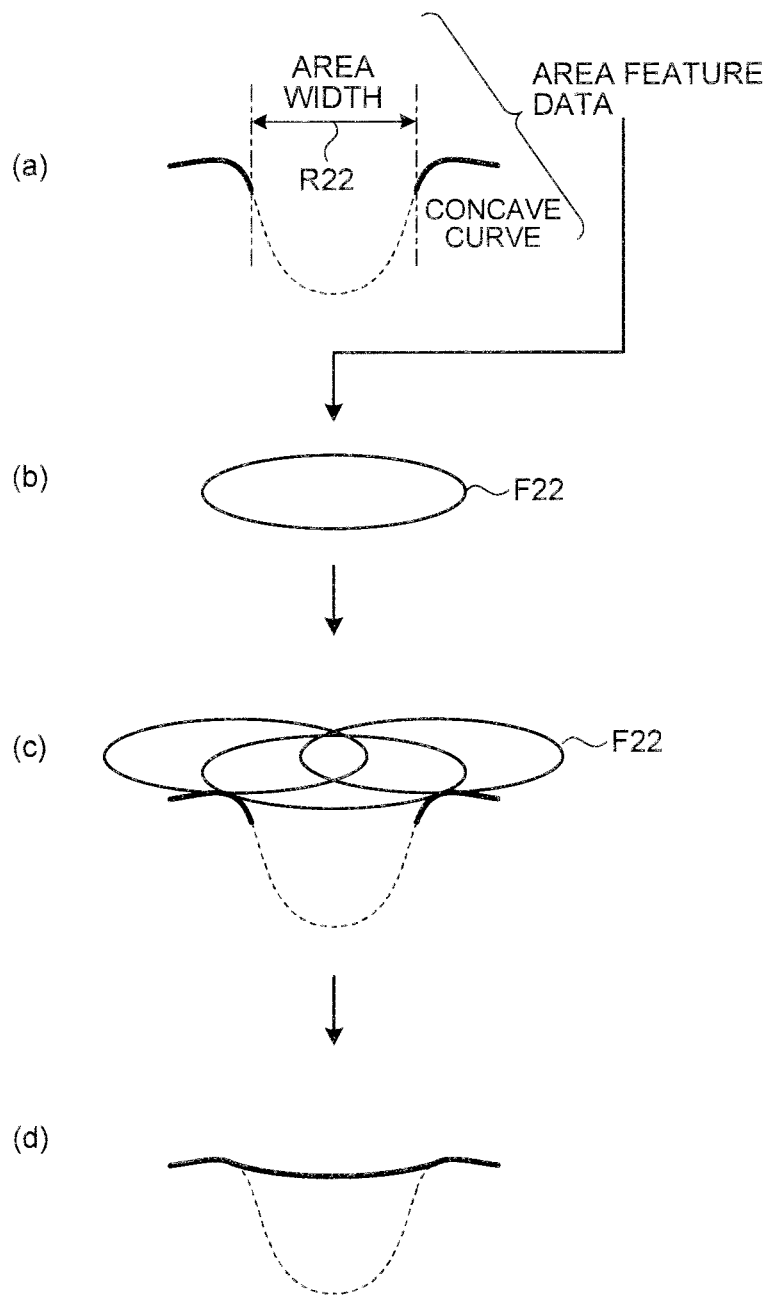
FIG. 9 is a conceptual diagram illustrating pixel value complementing using a morphology closing process.

FIG. 8 is a conceptual diagram illustrating pixel value complementing using a morphology opening process, and FIG. 9 is a conceptual diagram illustrating pixel value complementing using a morphology closing process. The morphology opening process illustrated in FIG. 8 is a process of acquiring a locus through which a maximum value of the outer periphery of a structure element passes when a reference diagram called structure element is moved while being circumscribed to a target image from the side on which a pixel value of the target image is small in a three-dimensional space in which each pixel value is regarded as elevation. On the other hand, the morphology closing process illustrated in FIG. 9 is a process of acquiring a locus through which a minimum value of the outer periphery of the structure element passes when the structure element is moved while being circumscribed to a target image from the side on which a pixel value of the target image is large in the same three-dimensional space. These are known techniques (reference: Obata Hidehumi, "Morphology", Corona Publishing Co., Ltd.).

Figure 10:
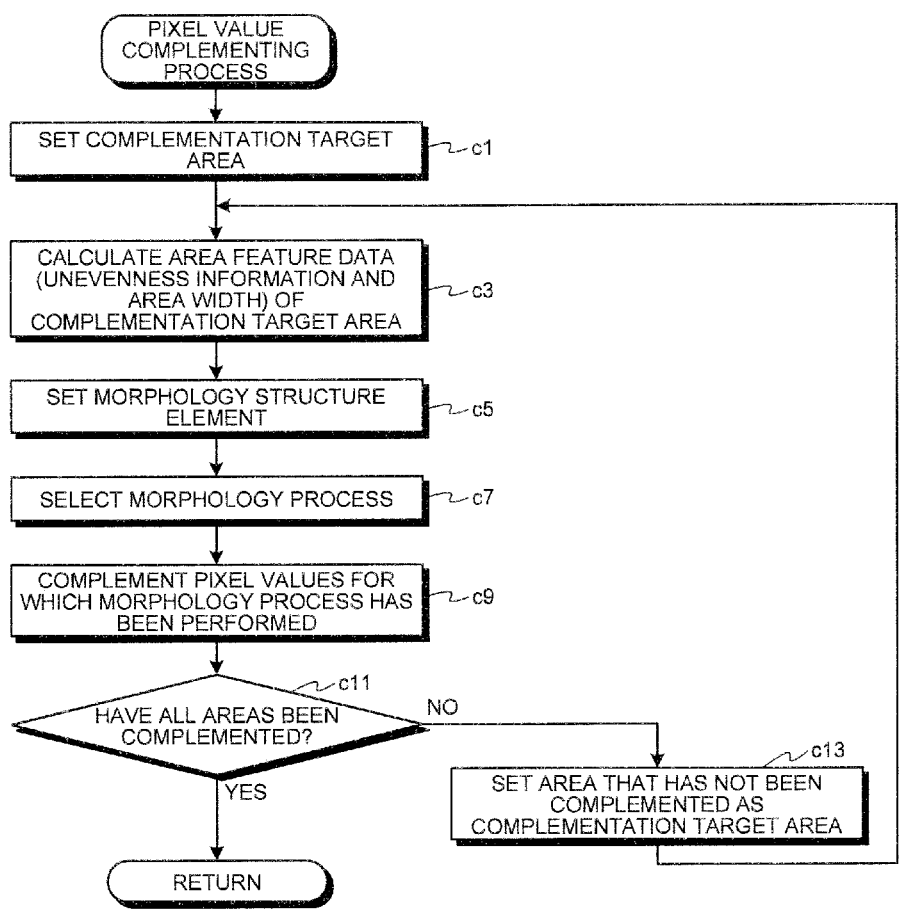
FIG. 10 is a flowchart illustrating the detailed processing sequence of a pixel value complementing process according to the first embodiment.

FIG. 10 is a flowchart illustrating the detailed processing sequence of a pixel value complementing process according to the first embodiment. In the pixel-value complementing process, as illustrated in FIG. 10, first, the pixel-value complementing unit 24 sets a classification target area (hereinafter, this classification target area as a processing target is referred to as a "complementation target area") as a processing target (Step c1). Then, the pixel-value complementing unit 24 calculates area feature data of the complementation target area (Step c3). There are two sets of the area feature data described here including the unevenness information of the change in the pixel value (curved shape) as a result of the unevenness determination performed in Step b5 illustrated in FIG. 7 and an area width that is newly calculated. The area width can be calculated by solving simultaneous equations represented in the following Equation (3) in a case where an area Area and a perimeter Peri (reference: "Digital Image Processing", CG-ARTS Society, 182P, *Area and Perimeter*) as shape feature data of the complementation target area are calculated by using a known technique, and then the complementation target area is approximated as a rectangle having a length L and a width W.

$$\begin{cases} Peri = 2 \times (W + L) \\ \text{Area} = W \times L \end{cases} \quad (3)$$

For example, as illustrated in FIG. 8(*a*), the unevenness information representing the convexity and the area width R21 are used as area feature data when the unevenness information is a convexity. Further, as illustrated in FIG. 9(*a*), the unevenness information representing the concavity and the area width R22 are used as area feature data when the unevenness information is a concavity. Here, in Step a11 of the previous stage illustrated in FIG. 4, the pixel value of the R component in an area other than the classification target area is selected, and the pixel value of the selected R component is set as a three-dimensional pixel value in the area other than the classification target area. In FIGS. 8(*a*) and 9(*a*), on the area periphery, the three-dimensional pixel value is denoted by a solid line, and, for the inside of the area that is complemented based on the three-dimensional pixel value of the area periphery, the pixel value of the intraluminal image is denoted by a broken line.

Next, the structure element generating unit 242, as illustrated in FIG. 10, sets the morphology structure element (Step c5). Here, unless structure elements that are larger than the area widths R21 and R22 illustrated in FIGS. 8(*a*) and 9(*a*) are used, the pixel values inside the area cannot be complemented based on the three-dimensional pixel values of the area periphery. Accordingly, in Step c5 illustrated in FIG. 10, as illustrated in FIGS. 8(*b*) and 9(*b*), structure elements F21 and F22 of sizes larger than the calculated area widths R21 and R22 are set.

Then, the morphology processing unit 241, as illustrated in FIG. 10, selects a morphology process (Step c7) and complements the pixel values by performing the selected morphology process in Step c9. In order to prevent the complementation process from being influenced by the change in the pixel value on the area boundary, the type of morphology process to be applied is changed based on whether the unevenness information is the convexity or the concavity.

Actually, in a case where the complementation target area is a convex area as illustrated in FIG. 8(*a*), the morphology opening process is selected, and the pixel values are complemented by applying the selected morphology opening process. In other words, as illustrated in FIG. 8(*c*), the structure element F21 illustrated in FIG. 8(*b*) is moved while being circumscribed to the area from the lower side of the area (from the side on which the pixel value is small), and as illustrated in FIG. 8(*d*), by complementing the pixel values of the inside of the area, three-dimensional pixel values inside the area are acquired. On the other hand, in a case where the complementation target area, as illustrated in FIG. 9(a), is a convex area, the morphology closing process is selected, and the pixel values area complemented by using the selected morphology closing process. In other words, as illustrated in FIG. 9(c), the structure element F22 illustrated in FIG. 9(b) is moved while being circumscribed to the area from the upper side of the area (from the side on which the pixel value is large), and as illustrated in FIG. 9(d), by complementing the pixel values of the inside of the area, the three-dimensional pixel values inside the area are acquired.

Thereafter, the pixel-value complementing unit 24, as illustrated in FIG. 10, determines whether the pixel values of all the complementation target area have been complemented. In a case where the pixel values of all the complementation target areas have not been complemented (No in Step c11), the pixel-value complementing unit 24 sets a classification target area that has not been complemented as a complementation target area (Step c13) and performs the process of Steps c3 to c11 again. On the other hand, in a case where the pixel values of all the classification target areas have been complemented (Yes in Step c11), the process is returned to Step a13 illustrated in FIG. 4 and then proceeds to Step a17 thereafter.

In addition, in a case where it is determined that there is no extracted area in Step a5 (No in Step a5), or in a case where it is determined that there is no area classified as an area of the blood vessel, the mirror reflection portion, or the color-changed lesion in Step a9 (No in Step a9), the R-component selecting unit 231 of the pixel-value calculating unit 23 selects the pixel values of the R component of the entire area of the intraluminal image, and subsequently, the pixel-value calculating unit 23 sets the pixel values of the selected R component as the three-dimensional pixel values of the pixels located in the entire area of the intraluminal image (Step a15).

Then, finally, the calculation unit 20 outputs the three-dimensional pixel value information, in which the pixel value of each pixel of the intraluminal image is set as the three-dimensional pixel value calculated in Steps a11 and a13 or the three-dimensional pixel value calculated in Step a15 (Step a17) and ends the process performed in the image processing apparatus 10.

As described above, according to the first embodiment, areas of a specific color, which represent the specific color, are extracted as areas that are strongly influenced by light absorption, mirror reflection, or the like, more particularly, the classification-target candidate areas as candidates for the areas of a blood vessel, a mirror reflection portion, and a color-changed lesion based on the pixel values of the intraluminal image. Then, based on the unevenness information of the curved shape and the smoothness of the curved shape of the classification-target candidate area that is represented by the pixel values of the inside of the classification-target candidate area, areas of a blood vessel, a mirror reflection portion, and a color-changed lesion that are strongly influenced by light absorption, mirror reflection, or the like out of the classification-target candidate areas are classified as the classification target areas. Accordingly, areas of the intraluminal image of which the pixel values do not correspond to the three-dimensional shape as an imaging target can be specified.

In addition, according to the first embodiment, by acquiring pixel values of a specific wavelength component that is specified in accordance with the degree of absorption or scattering inside the body are acquired for an area other than the classification target areas of which the pixel values specified as above do not correspond to the three-dimensional shape of the imaging target, the three-dimensional pixel values corresponding to the three-dimensional shape of the body tissue are acquired. Then, by complementing the pixel values of the areas of a blood vessel, a mirror reflection portion, and a color-changed lesion as the classification target areas by performing a morphology process based on the pixel values of the specific wavelength component that are acquired, for example, as the three-dimensional pixel values of the periphery of the classification target area, the three-dimensional pixel values of the inside of the classification target area are acquired. Accordingly, the three-dimensional pixel value that appropriately represents the three-dimensional shape of the body tissue in the entire area of the intraluminal image can be calculated and be output as the three-dimensional pixel value information.

Second Embodiment

Figure 11:
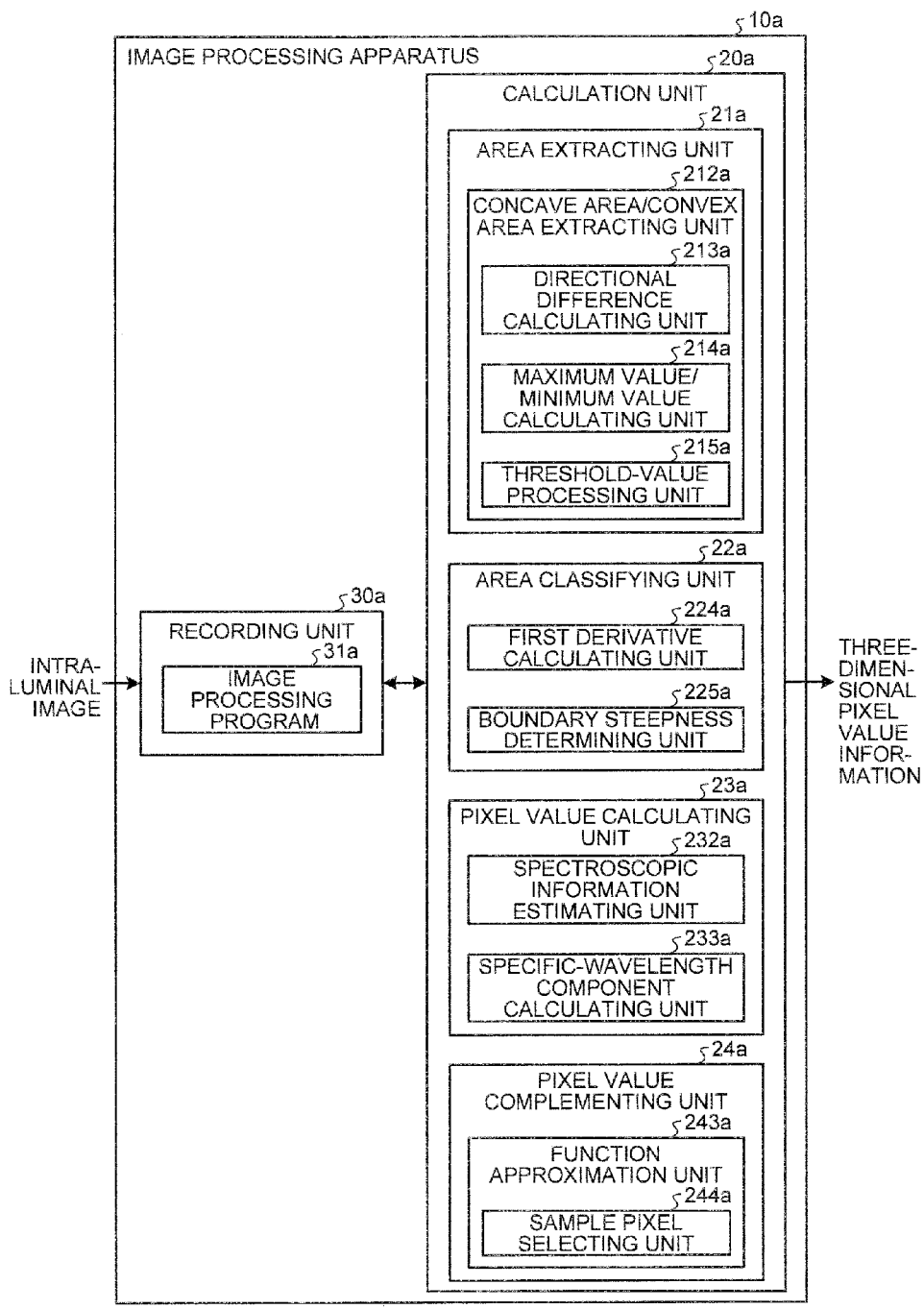
FIG. 11 is a schematic block diagram illustrating the main configuration of an image processing apparatus according to a second embodiment.

First, the configuration of an image processing apparatus according to a second embodiment will be described. FIG. 11 is a schematic block diagram illustrating the main configuration of an image processing apparatus 10a according to the second embodiment. The same reference numeral is assigned to the same configuration as that described in the first embodiment. The image processing apparatus 10a according to the second embodiment includes a calculation unit 20a and a recording unit 30a, as illustrated in FIG. 11. This image processing apparatus 10a, for example, is built in an endoscope and outputs calculated three-dimensional pixel value information by receiving an intraluminal image that is imaged by the endoscope as an input and processing the intraluminal image.

The calculation unit 20a includes an area extracting unit 21a, an area classifying unit 22a, a pixel-value calculating unit 23a, and a pixel-value complementing unit 24a.

The area extracting unit 21a is a functional unit used for extracting candidate areas (classification-target candidate areas) for classification target areas from an intraluminal image. According to the second embodiment, the area extracting unit 21a extracts the classification-target candidate areas based on information of the change in the pixel value with respect to periphery pixels. This area extracting unit 21a includes a concave area/convex area extracting unit 212a that extracts a concave area that represents a pixel value less than the average value of pixel values of the periphery pixels and a convex area that represents a pixel value greater than the average value of the pixel values of the periphery pixels. This concave area/convex area extracting unit 212a includes a directional difference calculating unit 213a, a maximum value/minimum value calculating unit 214a, and a threshold value processing unit 215a. The directional difference calculating unit 213a calculates a difference value between a pixel of interest and an average value of periphery pixels that oppose each other in a predetermined direction with the pixel of interest located at the center thereof for each of a plurality of directions. The maximum value/minimum value calculating unit 214a calculates a maximum value and a minimum value of the difference values. The threshold value processing unit 215a performs threshold-value processing for the maximum value and the minimum value.

The area classifying unit 22a classifies areas of a blood vessel, a mirror reflection portion, and a color-changed lesion out of the classification-target candidate areas as classification target areas based on the steepness of the change in the pixel value of the boundary portion of the classification-target candidate area. This area classifying unit 22a includes a first derivative calculating unit 224a and a boundary steepness determining unit 225a. The first derivative calculating unit 224a calculates a first derivative value by applying a first derivative filter to the pixel of the boundary portion of the classification-target candidate area. The boundary steepness determining unit 225a determines the steepness of the change in the pixel value of the boundary portion of the classification-target candidate area based on the first derivative value of the pixel of the boundary portion of the classification-target candidate area.

The pixel-value calculating unit 23a calculates pixel values of a specific wavelength component that is specified in accordance with the degree of absorption or scattering inside a body tissue as three-dimensional pixel values for an area other than the classification target areas. This pixel-value calculating unit 23a includes a spectroscopic information estimating unit 232a and a specific-wavelength component calculating unit 233a. The spectroscopic information estimating unit 232a estimates spectroscopic information of a body tissue based on a plurality of wavelength components of pixel values of an area other than the classification target areas. The specific-wavelength component calculating unit 233a calculates a pixel value of a specific wavelength component based on the estimated spectroscopic information of the body tissue.

The pixel-value complementing unit 24a complements the three-dimensional pixel values of the areas of the blood vessel, the mirror reflection portion, and the color-changed lesion as the classification target areas based on the pixel values of the specific-wavelength component of the area other than the classification target areas. This pixel-value complementing unit 24a includes a function approximation unit 243a that approximates the pixel values of the classification target area as a function based on the pixel values of the periphery of the classification target area. The function approximation unit 243a includes a sample pixel selecting unit 244a that selects sample pixels used for the function approximation from at least two periphery areas opposing each other with the classification target area interposed therebetween.

In the recording unit 30a, an image processing program 31a used for calculating three-dimensional pixel value information from the intraluminal image is recorded.

Figure 12:
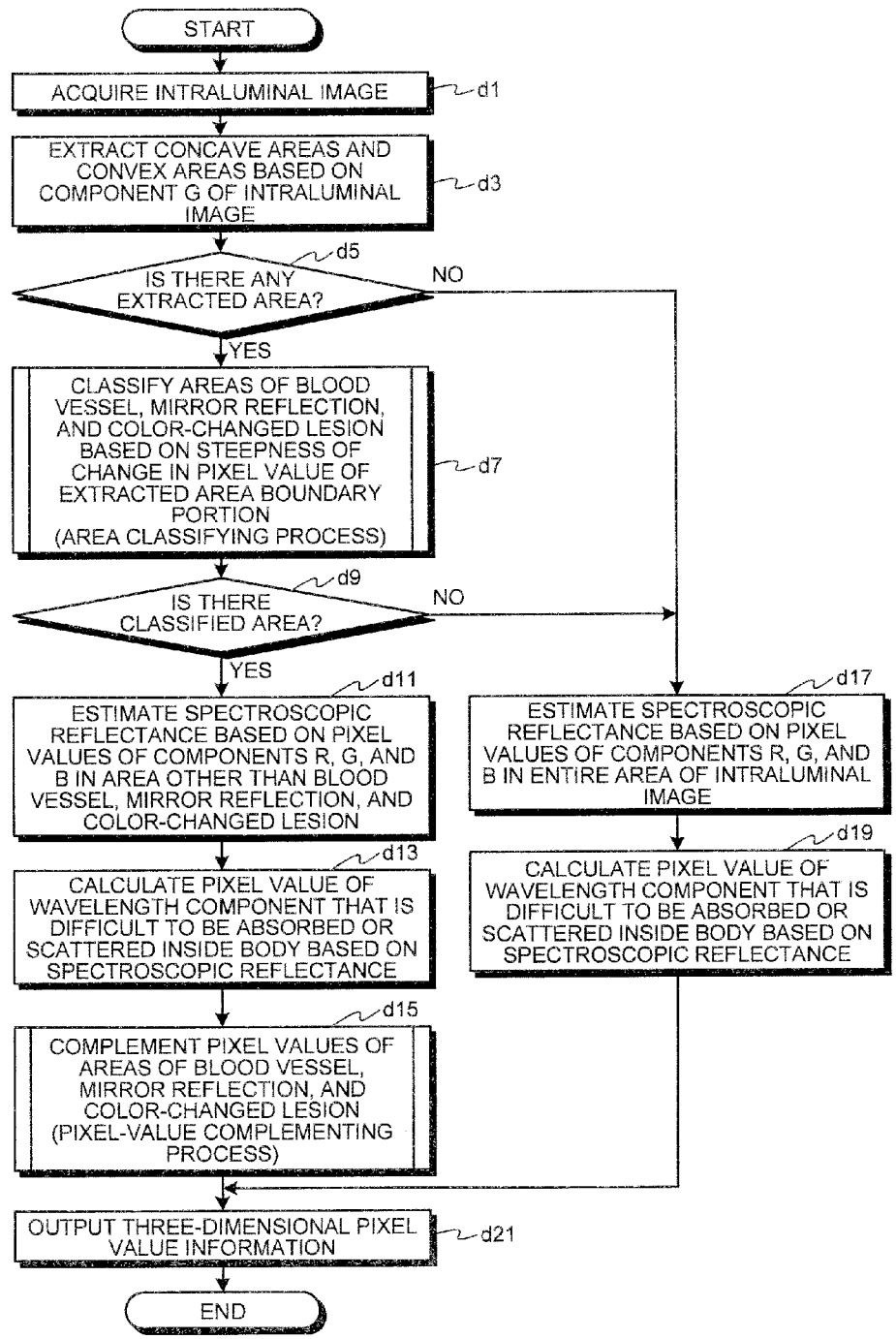
FIG. 12 is the whole flowchart illustrating the processing sequence performed by an image processing apparatus according to the second embodiment.

Next, the detailed processing sequence performed by the image processing apparatus 10a according to the second embodiment will be described. FIG. 12 is an entire flowchart illustrating the processing sequence performed by the image processing apparatus 10a according to the second embodiment. The process described here is realized by executing the image processing program 31a recorded in the recording unit 30a by using the calculation unit 20a.

First, the calculation unit 20a acquires an intraluminal image as a processing target (Step d1).

Next, the concave area/convex area extracting unit 212a of the area extracting unit 21a extracts concave areas and convex areas from an intraluminal image as a processing target based on the pixel values of the component G as classification-target candidate areas (Step d3). As illustrated in FIGS. 6A, 6B, 6C, and 6D referred to in the first embodiment, for each area of a blood vessel, a mirror reflection portion, or a color-changed lesion, the curved shape represented by the pixel values of the inside of the area is a convex shape or a concave shape. Accordingly, the pixel values of the inside of the area are different from the pixel values of the periphery pixels. Described in more detail, the area of the mirror reflection portion or the white lesion area is formed as a convex area having a pixel value greater than the average value of the pixel values of the periphery pixels. On the other hand, the area of a blood vessel or a red or black lesion area is formed as a concave area having a pixel value less than the average value of the pixel values of the periphery pixels. Thus, according to the second embodiment, by extracting the convex areas and the concave areas (hereinafter, these will be collectively referred to as "concavo-convex areas") of the pixel values from the intraluminal image, classification-target candidate areas as candidates for a blood vessel, a mirror reflection portion, and a color-changed lesion are extracted.

Figure 13:
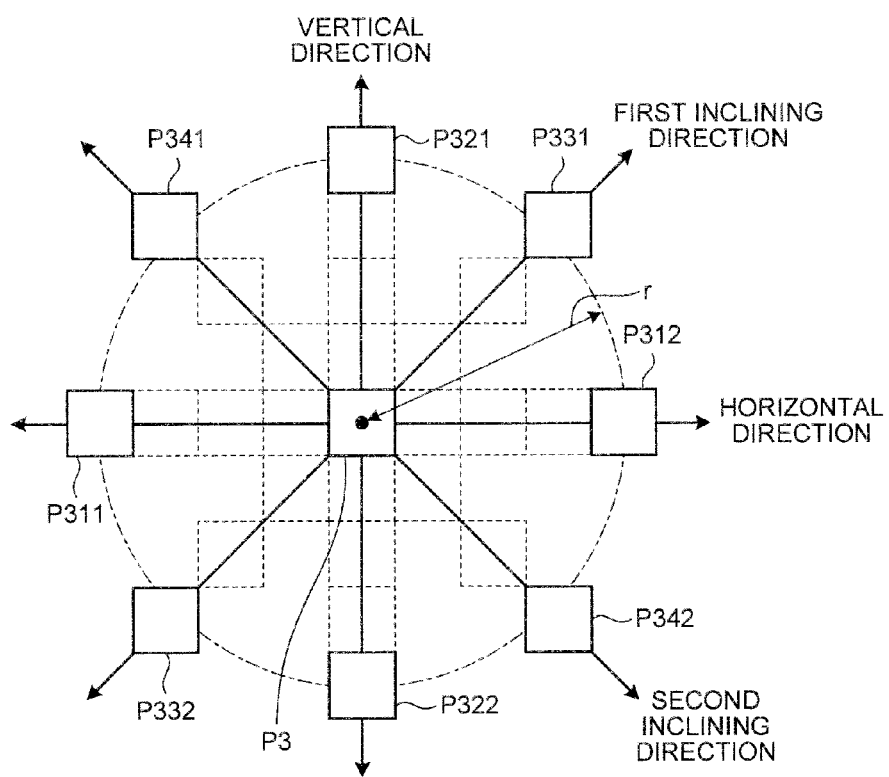
FIG. 13 is a conceptual diagram illustrating the calculation of a difference value for each direction.

While there are various methods of extracting the concavo-convex areas of the pixel values, here, a method is illustrated in which the concavo-convex areas are detected by calculating a difference between values of a pixel of interest and periphery pixels for each direction. FIG. 13 is a conceptual diagram illustrating the calculation of a difference value for each direction. In the second embodiment, as illustrated in FIG. 13, the difference values are calculated for four directions including the horizontal direction, the vertical direction, a direction inclined toward the upper right side (first inclining direction) and a direction inclined toward the lower right side (second inclining direction). Described in more detail, when a pixel located at the center is set as the pixel P3 of interest, a difference value dH for the horizontal direction is calculated based on the pixel value of the pixel P3 of interest and the pixel values of periphery pixels P311 and P312 that are apart from the pixel P3 of interest by a radius r of a circle denoted by a dashed-dotted line in FIG. 13 along the horizontal direction. Similarly, a difference value dV for the vertical direction is calculated based on the pixel value of the pixel P3 of interest and the pixel values of periphery pixels P321 and P322 that are apart from the pixel P3 of interest by the radius r in the vertical direction. In addition, a difference value dD1 for the first inclining direction is calculated based on the pixel value of the pixel P3 of interest and the pixel values of periphery pixels P331 and P332 that are apart from the pixel P3 of interest by the radius r in the first inclining direction, and a difference value dD2 for the second inclining direction is calculated based on the pixel value of the pixel P3 of interest and the pixel values of periphery pixels P341 and P342 that are apart from the pixel P3 of interest by the radius r in the second inclining direction.

Actually, first, the directional difference calculating unit 213a, for each pixel (x, y) of the intraluminal image, calculates the difference value dH between the pixel value of each pixel and an average value of periphery pixels that oppose each other in the horizontal direction, a difference value dV between the pixel value of each pixel and an average value of periphery pixels opposing each other in the vertical direction, a difference value dD1 between the pixel value of each pixel and an average value of periphery pixels opposing each other in the first inclining direction, and a difference value dD2 between the pixel value of each pixel and an average value of periphery pixels opposing each other in the second inclining direction, using the following Equations (4) to (7).

$$dH(x,y)=P(x,y)-0.5\times(P(x-r,y)+P(x+r,y)) \quad (4)$$

$$dV(x,y)=P(x,y)-0.5\times(P(x,y-r)+P(x,y+r)) \quad (5)$$

$$dD1(x,y)=P(x,y)-0.5\times(P(x-r',y+r')+P(x+r',y-r')) \quad (6)$$

$$dD2(x,y)=P(x,y)-0.5\times(P(x-r',y-r')+P(x+r',y+r')) \quad (7)$$

Here, r' represented in Equations (6) and (7) is a constant acquired by rounding off $r/(2^{0.5})$.

Here, P(x, y) is a pixel value of the component G at the coordinates(x, y) of the intraluminal image. In addition, r corresponds to "r" illustrated in FIG. 13 and is a parameter representing the pixel range at the time of calculating the difference value. By decreasing the value of r, a concavo-convex area having large concavo-convex patterns can be detected. On the other hand, by increasing the value of r, a concavo-convex area having small concavo-convex patterns can be detected. The value of r may be statically set in advance or may be set dynamically based on an image or the like. Here, the reason for using the component G is that the sensitivity near the absorption band of blood can be acquired, and a blood, a color-changed lesion, or the like can be easily extracted as a concavo-convex area. The extraction of the concavo-convex area is not limited to being performed by using the component G and may be performed by using another color component, a value that is secondarily calculated through a known conversion process, luminance, a color difference (YCbCr conversion), hue, saturation, intensity (HSI conversion), a color ratio, or the like.

Then, after the maximum value/minimum value calculating unit 214a calculates a maximum value of the difference values dH, dV, dD1, and dD2 for each direction, the threshold value processing unit 215a extracts convex areas by extracting pixels for which the calculated maximum value is a predetermined threshold value or more. In addition, after the maximum value/minimum value calculating unit 214a calculates a minimum value (negative value) of the difference values dH, dV, dD1, and dD2 for each direction, the threshold value processing unit 215a extracts concave areas by extracting pixels for which the calculated minimum value is a predetermined threshold value or less. Consequently, for example, a candidate area image is generated in which positive values (label values) used for identifying concavo-convex patterns are set to the pixels of the extracted area, and "0" is set to the other pixels.

As above, although the extraction method using the difference value for each direction is illustrated in this example, here, a method other than the method described in this example may be used as long as concavo-convex areas can be extracted from an intraluminal image by using it. For example, concavo-convex areas may be extracted from the intraluminal image based on a correlation value with respect to a model shape of concavo-convex patterns.

Next, the calculation unit 20a, as illustrated in FIG. 12, determines whether or not there is an extracted area as the concavo-convex area (classification-target candidate area). This can be determined by determining whether or not there is a pixel of which the pixel value is a positive value in the candidate area image. In a case where there is no extracted area (No in Step d5), the process proceeds to Step d17 to be described later.

On the other hand, in a case where there is an extracted area (classification-target candidate area) (Yes in Step d5), the area classifying unit 22a classifies areas of a blood vessel, a mirror reflection portion, and a color-changed lesion, which are the classification target areas, out of the classification-target candidate areas based on the steepness of the change in the pixel value of the boundary portion of the classification-target candidate area by performing an area classifying process (Step d7). In the concavo-convex area extracted based on the pixel value change information with respect to the periphery pixel in Step d3, there is a possibility that an mucous membrane undulation including a difference in level of the mucous membrane, a mucous membrane groove, the shaped-changed lesion, or the like other than the blood vessel, the mirror reflection portion, and the color-changed lesion is included. The reason for this is that when a distance between the surface of the mucous membrane and the imaging system changes due to the mucous membrane undulation or the shape change in the mucous membrane, the pixel value changes in accordance with the change in the distance. Accordingly, in the area classifying process according to the second embodiment, both areas are classified based on the steepness of the change in the pixel value of the boundary portion of the classification-target candidate area.

In addition, before the classification, pixels having the same pixel value within the candidate area image are connected to each other through a labeling process, similarly to the first embodiment.

Figure 14:
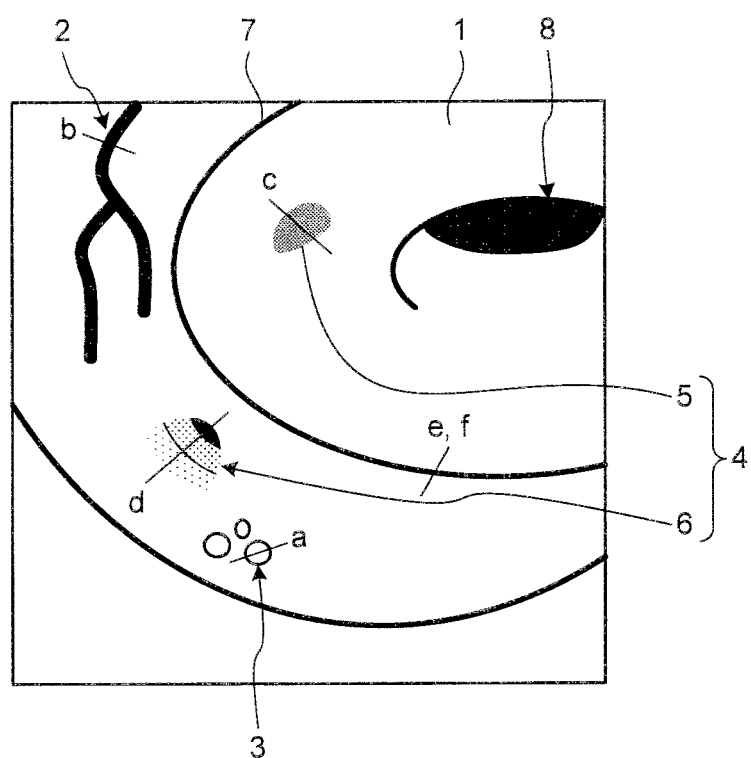
FIG. 14 is a diagram illustrating the cross-section directions of a blood vessel, a mirror reflection portion, a color-changed lesion, and a mucous membrane undulation.
Figure 15A:
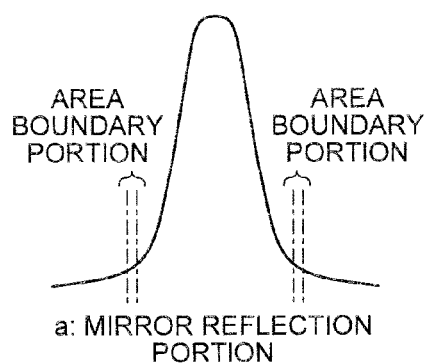
FIG. 15A is a schematic diagram illustrating a change in the pixel value in the area boundary portion of the mirror reflection portion along cross-section direction a illustrated in FIG. 14.
Figure 15B:
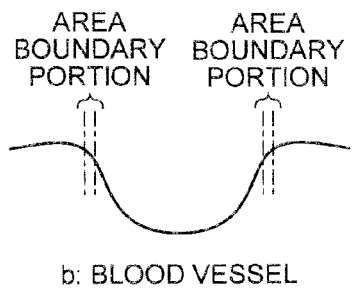
FIG. 15B is a schematic diagram illustrating a change in the pixel value in the area boundary portion of the blood vessel along cross-section direction b illustrated in FIG. 14.
Figure 15C:
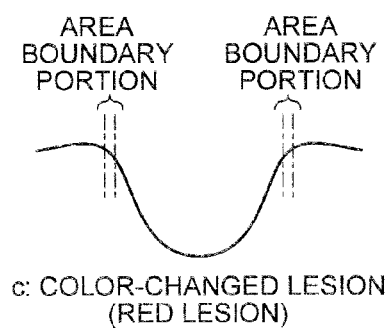
FIG. 15C is a schematic diagram illustrating a change in the pixel value in the area boundary portion of the color-changed lesion along the cross-section direction c illustrated in FIG. 14.
Figure 15D:
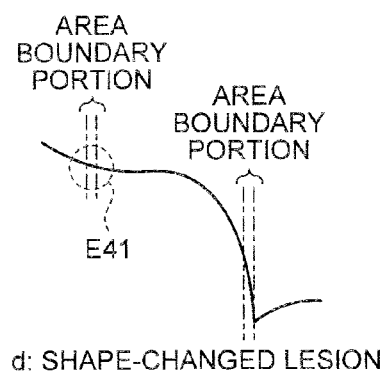
FIG. 15D is a schematic diagram illustrating a change in the pixel value in the area boundary portion of a shape-changed lesion along cross-section direction d illustrated in FIG. 14.
Figure 15E:
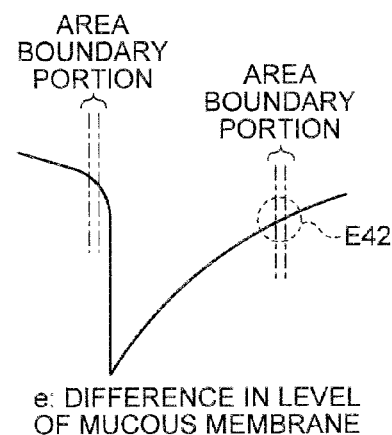
FIG. 15E is a schematic diagram illustrating a change in the pixel value in the area boundary portion of a difference in level of the mucous membrane along cross-section direction e illustrated in FIG. 14.
Figure 15F:
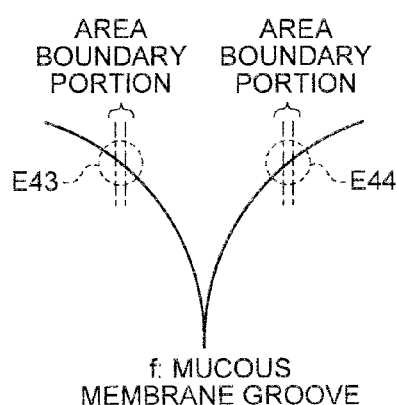
FIG. 15F is a schematic diagram illustrating a change in the pixel value in the area boundary portion of a mucous membrane groove along cross-section direction f illustrated in FIG. 14.

Here, before the detailed processing sequence of the area classifying process is described, the features of the area boundary portion of each category area that is included in the concavo-convex area will be described. FIG. 14 is a diagram illustrating the cross-section directions a to f of each category of a blood vessel 2, a mirror reflection portion 3, a color-changed lesion 5, the shape-changed lesion 6, and a mucous membrane undulation 7. FIG. 15A is a schematic diagram illustrating a change in the pixel value in the area boundary portion of the mirror reflection portion 3 along cross-section direction a illustrated in FIG. 14. FIG. 15B is a schematic diagram illustrating a change in the pixel value in the area boundary portion of the blood vessel 2 along cross-section direction b illustrated in FIG. 14. FIG. 15C is a schematic diagram illustrating a change in the pixel value in the area boundary portion of the color-changed lesion (for example, a red lesion) 5 along the cross-section direction c illustrated in FIG. 14. FIG. 15D is a schematic diagram illustrating a change in the pixel value in the area boundary portion of the shape-changed lesion 6 along cross-section direction d illustrated in FIG. 14. FIG. 15E is a schematic diagram illustrating a change in the pixel value in the area boundary portion along cross-section direction e in a case where the mucous membrane undulation 7 illustrated in FIG. 14 is a difference in level of a mucous membrane. FIG. 15F is a schematic diagram illustrating a change in the pixel value in the area boundary portion along cross-section direction f in a case where the mucous membrane undulation 7 illustrated in FIG. 14 is a mucous membrane groove.

Here, in the mirror reflection portion 3 along cross-section direction a illustrated in FIG. 14, the blood vessel 2 along cross-section direction b, and the color-changed lesion 5 along the cross-section direction c, due to the change in the pixel value caused by local reflection or light absorption, the change in the pixel value in the boundary is steep as illustrated in FIGS. 15A, 15B, and 15C. On the other hand, in the shape-changed lesion 6 along cross-section direction d illustrated in FIG. 14 or the mucous membrane undulation 7 along cross-section directions e and f, the change in the pixel value on the boundary other than a boundary that is caused by occlusion (an area that is not imaged by being shielded by a foreground when a three-dimensional object is two-dimensionally imaged), as illustrated in the portions E41 to E44 surrounded by broken lines in FIGS. 15D, 15E, and 15F, is continuous in the shape, and accordingly, the change in the pixel is not steep. Such a difference is more prominent as the wavelength is closer to the absorption band of the blood such as the component G and the component B. In the area classifying process of the second embodiment, the areas of a blood vessel, a mirror reflection portion, and a color-changed lesion are classified out of the classification-target candidate areas based on such features.

Figure 16:
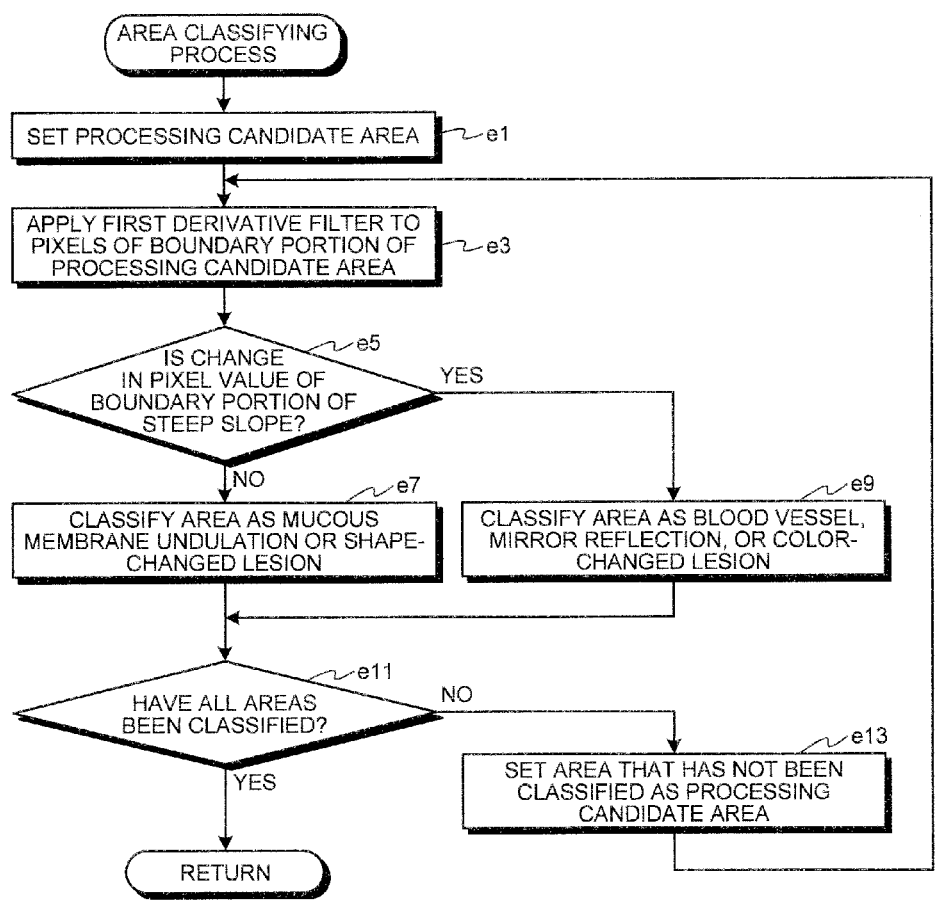
FIG. 16 is a flowchart illustrating the detailed processing sequence of an area classifying process according to a second embodiment.

FIG. 16 is a flowchart illustrating the detailed processing sequence of the area classifying process according to the second embodiment. In the area classifying process, as illustrated in FIG. 16, first, the area classifying unit 22a sets a classification-target candidate area (processing candidate area) as a processing target (Step e1).

Next, the first derivative calculating unit 224a calculates a first derivative value of each pixel by applying a known first derivative filter (reference: "Digital Image Processing", CG-ARTS Society, 114P, *Differential Filter*) to the pixel values of the component G or B of the boundary portion of the candidate processing area in Step e3. At this time, in order to reduce the influence of a noise, for example, a Sobel filter that is a first derivative filter accompanying smoothing is used. In addition, in order to recognize boundary pixels of the processing candidate area, a known contour tracking process (reference: "Digital Image Processing", CG-ARTS Society, 178P, *Contour Tracking*) may be used.

Next, the boundary steepness determining unit 225a determines whether or not the change in the pixel of the boundary portion of the processing candidate processing area is steep. Actually, the absolute values of the first derivative values are acquired for every boundary pixel, the acquired first derivative values are sorted in the descending order, and a first derivative value corresponding to a half of the total number of the boundary pixels from the smaller side is selected, thereby acquiring an average value. The reason for this is for excluding the influence of the occlusion described above. Then, by determining whether or not the average value is a predetermined threshold value or more, it is determined whether or not the change in the pixel value of the boundary portion of the processing candidate area is steep. In a case where the change in the pixel value of the boundary portion of the processing candidate area is determined not to be steep (No in Step e5), the area classifying unit 22a classifies the processing candidate area as a mucous membrane undulation or a shape-changed lesion (Step e7).

On the other hand, in a case where the change in the pixel value of the boundary portion of the processing candidate area is determined to be steep (Yes in Step e5), the area classifying unit 22a classifies the processing candidate area as a blood vessel, a mirror reflection portion, or a color-changed lesion (Step e9).

Thereafter, the area classifying unit 22a determines whether all the classification-target candidate areas have been classified. In a case where all the classification-target candidate areas have not been classified (No in Step e11), the area classifying unit 22a sets a classification-target candidate area that has not been classified as the processing candidate area (Step e13) and performs the process of Steps e3 to e11 again. On the other hand, in a case where all the classification-target candidate areas have been classified (Yes in Step e11), the process is returned to Step d7 illustrated in FIG. 12 and proceeds to Step d9. Consequently, similarly to the first embodiment, a classification-target area image is generated in which positive values (label values) used for identifying areas are set to the pixels of the areas classified as the blood vessel, the mirror reflection portion, and the color-changed lesion as the classification target areas, and "0" is set to pixels of the areas other than the classification target areas.

Next, the calculation unit 20a determines whether or not there is an area that is classified as a blood vessel, a mirror reflection portion, or a color-changed lesion that is the classification target area. This can be determined by determining whether or not there is a pixel having a positive value as its pixel value in the classification target area image. In a case where there is no area classified as the blood vessel, the mirror reflection portion, or the color-changed lesion (No in Step d9), the process proceeds to Step d17 to be described later.

On the other hand, in a case where there is an area (classification target area) classified as the blood vessel, the mirror reflection portion, or the color-changed lesion (Yes in Step d9), first, the spectroscopic information estimating unit 232a of the pixel-value calculating unit 23a estimates, for example, spectroscopic reflectance as spectroscopic information of an area other than the classification target area based on the pixel values of components R, G, and B of areas other than the classification target area (Step d11). In addition, the estimated spectroscopic information is not limited to the spectroscopic reflectance but may be spectroscopic transmittance, spectroscopic absorbance, or the like.

Described in more detail, the spectroscopic reflectance of each of a plurality of body tissues is collected in advance, and principal component analysis or the like is performed for the spectroscopic reflectance so as to set three types of base vectors $O1(\lambda)$, $O2(\lambda)$, and $O3(\lambda)$. Here, $\lambda$ is n discrete values that are set at regular intervals in a visible light wavelength region (380 nm to 780 nm).

The weighting factors o1, o2, and o3 for each base vector in a case where the spectroscopic reflectance $O(\lambda)$ of the body tissues is approximated by applying the weighting factors to the base vectors $O1(\lambda)$, $O2(\lambda)$, and $O3(\lambda)$ can be calculated by using the following Equation (8) based on the pixel values Pr, Pg, and Pb of the components R, G, and B of each pixel of the area (here, an area other than the classification target area) as an estimation target, spectroscopic energy $I(\lambda)$ of illumination light, and the spectroscopic sensitivities $Sr(\lambda)$, $Sg(\lambda)$, and $Sb(\lambda)$ of imaging devices that configure the imaging system.

$$\begin{bmatrix} o1 \\ o2 \\ o3 \end{bmatrix} = [SI \times O]^{-1} \times \begin{bmatrix} Pr \\ Pg \\ Pb \end{bmatrix} \quad (8)$$

where, $$SI = \begin{bmatrix} Sr(\lambda 1) \times I(\lambda 1) & Sr(\lambda 2) \times I(\lambda 2) & \cdots & Sr(\lambda n) \times I(\lambda n) \\ Sg(\lambda 1) \times I(\lambda 1) & Sg(\lambda 2) \times I(\lambda 2) & \cdots & Sg(\lambda n) \times I(\lambda n) \\ Sb(\lambda 1) \times I(\lambda 1) & Sb(\lambda 2) \times I(\lambda 2) & \cdots & Sb(\lambda n) \times I(\lambda n) \end{bmatrix}$$

$$O = \begin{bmatrix} O1(\lambda 1) & O2(\lambda 1) & O3(\lambda 1) \\ O1(\lambda 2) & O2(\lambda 2) & O3(\lambda 2) \\ \vdots & \vdots & \vdots \\ O1(\lambda n) & O2(\lambda n) & O3(\lambda n) \end{bmatrix}$$

Actually, in Step d11, the weighing factors o1, o2, o3 are calculated for each pixel of an area other than the classification target area by using Equation (8) described above. Thereafter, the base vectors $O1(\lambda)$, $O2(\lambda)$, and $O3(\lambda)$ are weighted for each pixel using the calculated weighting factors o1, o2, and o3, and the spectroscopic reflectance $O(\lambda)$ at each pixel of the area other than the classification target area is estimated.

Next, the specific-wavelength component calculating unit 233a calculates the pixel value of a specific wavelength component (a wavelength component that cannot be easily absorbed or scattered inside the body) based on the spectroscopic reflectance estimated in Step d11, and subsequently, the pixel-value calculating unit 23a sets the calculated pixel value of the specific wavelength component as a three-dimensional pixel value of the area other than the classification target area (Step d13). In a case where the spectroscopic sensitivity of the imaging device is limited to a wavelength component that cannot be easily absorbed or scattered inside the body, a pixel value that corresponds to the three-dimension image of the body tissue with high accuracy can be acquired. The absorption of light inside the body mainly occurs in the absorption band of the blood (absorption bands of oxy-hemoglobin and dioxy-hemoglobin contained in the blood), and the scattering of light can easily occur for a short wavelength component. Thus, according to the second embodiment, the wavelength component that cannot be easily absorbed or scattered inside the body is set to a band other than the absorption band of the blood and a long wavelength component that is a predetermined threshold value or more. Then, this wavelength component is set as the specific wavelength component, and the pixel value Px is calculated by using the following Equation (9) based on the spectroscopic sensitivity $Sx(\lambda)$ of an imaging device assumed to have sensitivity for the specific wavelength component, the spectroscopic energy $I(\lambda)$ of the illumination light, and the estimated spectroscopic reflectance $O(\lambda)$.

$$Px[Sx(\lambda 1) \times I(\lambda 1) \quad Sx(\lambda 2) \times I(\lambda 2) \quad \cdots \quad Sx(\lambda n) \times I(\lambda n)] \times \begin{bmatrix} O(\lambda 1) \\ O(\lambda 2) \\ \vdots \\ O(\lambda n) \end{bmatrix} \quad (9)$$

In addition, in this example, the spectroscopic information is estimated by using three types of base vectors and the components R, G, and B of each pixel. On the other hand, in a case where the present invention is applied to an endoscope that can image, for example, three or more wavelength components, the spectroscopic information may be estimated based on the acquired wavelength components and base vectors of a type corresponding to the number of the wavelength components.

Next, the pixel-value complementing unit 24a complements the pixel values of the areas of the blood vessel, the mirror reflection portion, and the color-changed lesion as the classification target areas by performing a pixel-value complementing process (Step d15). According to the second embodiment, the pixel-value complementing process is performed by using function approximation. Through this process, the three-dimensional pixel values of the classification target area are complemented based on the pixel values of the specific wavelength component that are calculated as the three-dimensional pixel values of the area (particularly, the area of the periphery of the classification target area) other than the classification target area in the former stage of Step d13.

FIG. 17 is a conceptual diagram illustrating pixel-value complementing using function approximation. In FIG. 17, while the three-dimensional pixel values calculated in the former stage of Step d13, which is illustrated in FIG. 12, in advance are denoted by solid lines on the periphery of the area, the pixel values of the intraluminal image are denoted by dotted lines on the inside of the area that are complemented based on the three-dimensional pixel values of the periphery of the area. In the pixel-value complementing process according to the second embodiment, as illustrated in FIG. 17(*a*), a plurality of sample pixels P51 is selected from the inside of at least two periphery areas opposing each other with the area interposed therebetween. The reason for this is for preventing the complementation process from being influenced by the change in the pixel value in the boundary portion of the complementation target area, and periphery pixels that are apart from the pixel of the boundary portion of the area by a predetermined distance or more are selected as the sample pixels P51. Then, the function formula of the approximated curve is acquired based on the pixel values of the plurality of sample pixels P51 that have been selected, and the three-dimensional pixel values of the inside of the area are acquired by complementing the pixel values of the inside of the area based on the acquired function formula of the approximated curve as denoted by a solid line in FIG. 17(*b*).

Figure 18:
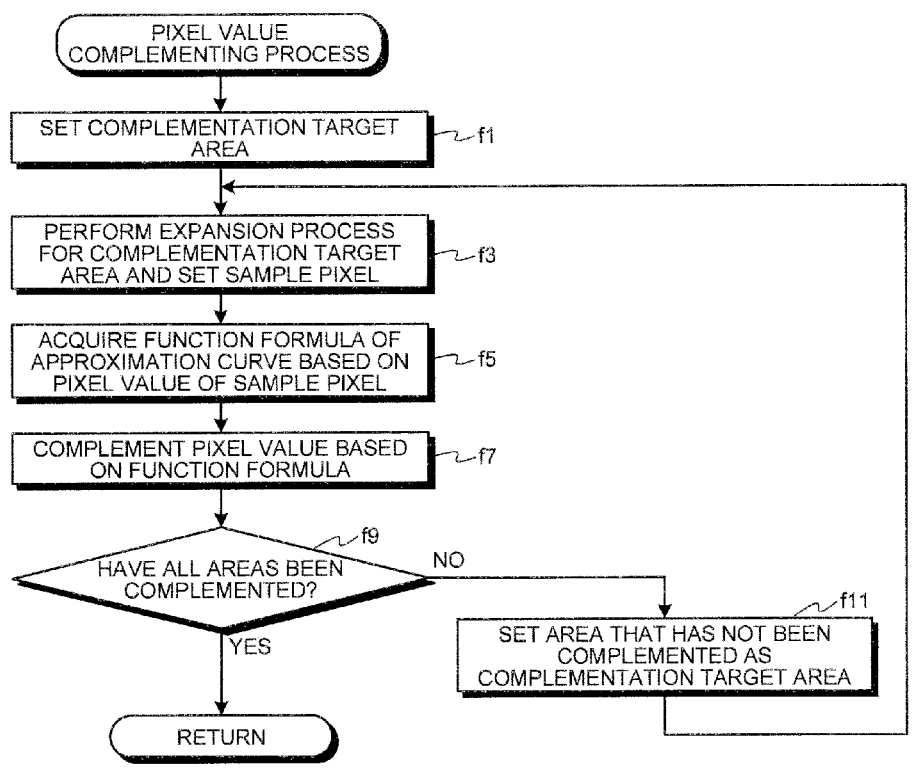
FIG. 18 is a flowchart illustrating the detailed processing sequence of a pixel value complementing process according to the second embodiment.

FIG. 18 is a flowchart illustrating the detailed processing sequence of the pixel-value complementing process according to the second embodiment. In the pixel-value complementing process, as illustrated in FIG. 18, first, the pixel-value complementing unit 24a sets a classification target area (complementation target area) as a processing target (Step f1). Next, the sample pixel selecting unit 244a performs an expansion process for the complementation target area and sets the sample pixels (Step f3). Described in more detail, it may be set such that the remaining pixels are selected based on a difference between a result of performing a known expansion process (reference: "Digital Image Processing", CG-ARTS Society, 179P, *Expansion Process*) $N_1$ times (here, $N_1$ is a predetermined value) and a result of performing the known expansion process $N_2$ times (here, $N_2$ is a predetermined value and is $N_1$ or less).

Next, the function approximation unit 243a acquires the function formula of the approximated curve based on the pixel values of the sample pixels (Step f5). In this example, as the function formula of the curved surface, a quadratic function represented in the following Equation (10) is used. Here, x and y are the coordinates of a pixel, and z is a pixel value.

$$z=ax^2+by^2+cxy+dx+ey+f \quad (10)$$

The coefficients a to f of the function formula represented in Equation (10) are acquired by using the following Equation (11) acquired by using a least-square method based on the coordinates (xi, yi) (i=1 to n; n is the number of sample pixels) of the sample pixels and the pixel value zi.

$$\begin{bmatrix} a \\ b \\ c \\ d \\ e \\ f \end{bmatrix} = (A^t \times A)^{-1} \times A^t \times \begin{bmatrix} z1 \\ z2 \\ \vdots \\ zn \end{bmatrix} \quad (11)$$

where, $$A = \begin{bmatrix} x1^2 & y1^2 & x1y1 & x1 & y1 & 1 \\ x2^2 & y2^2 & x2y2 & x2 & y2 & 1 \\ \vdots & \vdots & \vdots & \vdots & \vdots & \vdots \\ xn^2 & yn^2 & xnyn & xn & yn & 1 \end{bmatrix}$$

Then, the pixel-value complementing unit 24a complements the pixel values based on the acquired function formula (Step f7). Described in more detail, the pixel values are calculated by using Equation (10) described above for each pixel of the complementation target area based on the coordinates thereof.

Thereafter, the pixel-value complementing unit 24a determines whether or not the pixel values of all the complementation target areas have been completed. In a case where all the complementation target pixels have not been complemented (No in Step f9), the pixel-value complementing unit 24a sets the classification target area that has not been completed as a complementation target area (Step f11) and performs the process of Steps f3 to f9 again. On the other hand, in a case where the pixel values of all the classification target areas are complemented (Yes in Step f9), the process is returned to Step d15 illustrated in FIG. 12 and then proceeds to Step d21.

In addition, in a case where it is determined that there is no extracted area in Step d5 (No in Step d5) or in a case where it is determined that there is no area classified as the area of the blood vessel, the mirror reflection portion, or the color-changed lesion in Step d9 (No in Step d9), first, the spectroscopic information estimating unit 232a of the pixel-value calculating unit 23a estimates the spectroscopic reflectance of each pixel of the entire area of the intraluminal image based on the pixel values of the components R, G, and B of the entire area of the intraluminal image (Step d17). Thereafter, the specific-wavelength component calculating unit 233a calculates the pixel values of the specific wavelength component (a wavelength component that cannot be easily absorbed or scattered inside the body) based on the spectroscopic reflectance estimated in Step d17, and subsequently, the pixel-value calculating unit 23a sets the calculated pixel values of the specific wavelength component as the three-dimensional pixel values of the pixels of the entire area of the intraluminal image (Step d19).

Finally, the calculation unit 20a outputs the three-dimensional pixel values calculated in Steps d13 and d15 based on the pixel values of the pixels of the intraluminal image or the three-dimensional pixel-value information that is set as the three-dimensional pixel values calculated in Step d19 (Step d21), and the process of the image processing apparatus 10a ends.

As described above, according to the second embodiment, a concave area representing a pixel value less than the average value of the pixels of the periphery pixels and a convex area representing a pixel value greater than the average value of the pixel values of the periphery pixels are extracted as areas that are strongly influenced by light absorption, mirror reflection, or the like, more particularly, classification target candidate areas that are candidates for the areas of a blood vessel, a mirror reflection portion, or a color-changed lesion, based on the information of the change in the pixel value with respect to the periphery pixels. Then, based on the steepness of the change in the pixel value of the boundary portion of the classification target candidate area, the areas of the blood vessel, the mirror reflection portion, and the color-changed lesion that are strongly influenced by light absorption, a mirror reflection portion, and the like out of the classification target candidate areas are classified as the classification target areas. Accordingly, areas of the intraluminal image in which the pixel value does not correspond to the three-dimensional shape of the imaging target can be specified.

In addition, according to the second embodiment, in an area other than the classification target area that are areas in which a specific pixel value does not correspond to the three-dimensional shape of the imaging target as described above, by acquiring the pixel values of a specific wavelength component that is specified in accordance with the degree of absorption or scattering inside the body, the three-dimensional pixel values corresponding to the three-dimensional shape of the body tissue are calculated. Then, function approximation is performed based on the pixel values of the specific wavelength component that are acquired, for example, as the three-dimensional pixel values of the periphery of the classification target area, and the pixel values of the areas of the blood, the mirror reflection portion, and the color-changed lesion as the classification target areas are complemented, whereby the three-dimensional pixel values of the inside of the classification target area are acquired. Therefore, the three-dimensional pixel values that appropriately represent the three-dimensional shape of the body tissue are calculated for the entire area of the intraluminal image and can be output as the three-dimensional pixel-value information.

Third Embodiment

Figure 19:
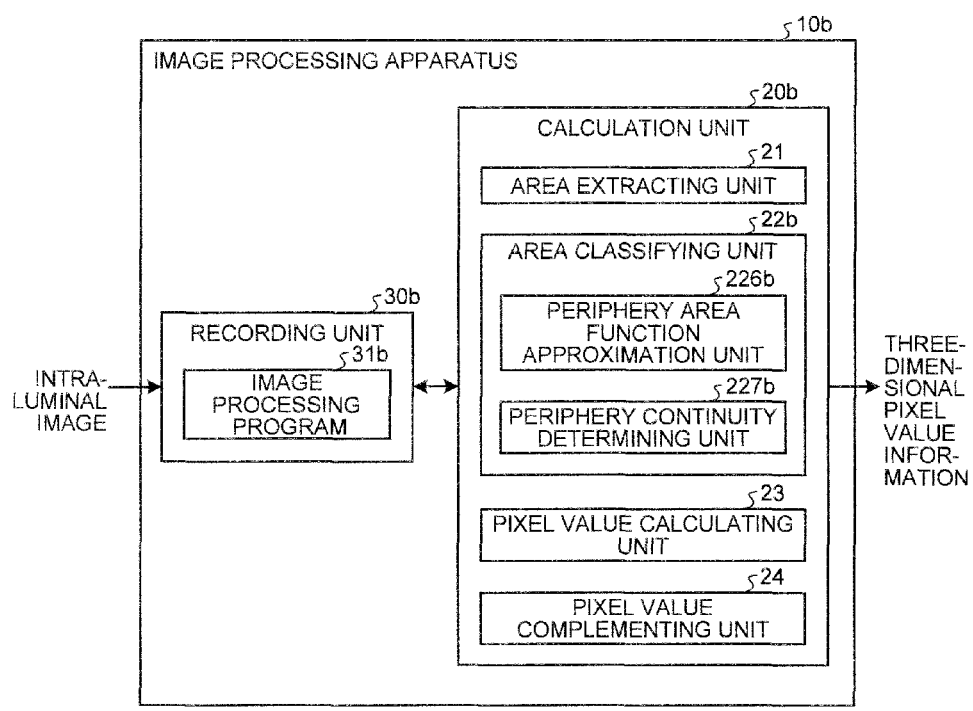
FIG. 19 is a schematic block diagram illustrating the main configuration of an image processing apparatus according to a third embodiment.

First, the configuration of an image processing apparatus according to a third embodiment will be described. FIG. 19 is a schematic block diagram illustrating the main configuration of an image processing apparatus 10b according to the third embodiment. The same reference numeral is assigned to the same configuration as that described in the first embodiment. The image processing apparatus 100b according to the third embodiment includes a calculation unit 20b and a recording unit 30b, as illustrated in FIG. 19. This image processing apparatus 10b, for example, similarly to the first embodiment, is built in an endoscope and outputs calculated three-dimensional pixel value information by receiving an intraluminal image that is imaged by the endoscope as an input and processing the intraluminal image.

This calculation unit 20b includes the area extracting unit 21 configured similarly to that of the first embodiment, an area classifying unit 22b, the pixel-value calculating unit 23 that is configured similarly to that of the first embodiment, and the pixel-value complementing unit 24 that is configured similarly to the first embodiment, and only the configuration of the area classifying unit 22b is different from that of the first embodiment.

The area classifying unit 22b according to the third embodiment classifies areas of a blood vessel, a mirror reflection portion, and a color-changed lesion out of the classification-target candidate areas as the classification target areas based on the continuity of the change in the pixel value (curved shape) of periphery portions of the classification target candidate area that are represented by the pixel values of the periphery portions of the classification target candidate areas. This area classifying unit 22b includes a periphery area function approximation unit 226b and a periphery continuity determining unit 227b. The periphery area function approximation unit 226b performs function approximation of the curved shape of the periphery portions of at least two classification target candidate areas opposing each other with the classification target candidate area interposed therebetween. The periphery continuity determining unit 227b determines the continuity of the change in the pixel value between the periphery portions of the area by comparing results of function approximation of the periphery portions of at least two classification target candidate areas.

In the recording unit 30b, an image processing program 31b used for calculating three-dimensional pixel value information from the intraluminal image is recorded.

Figure 20:
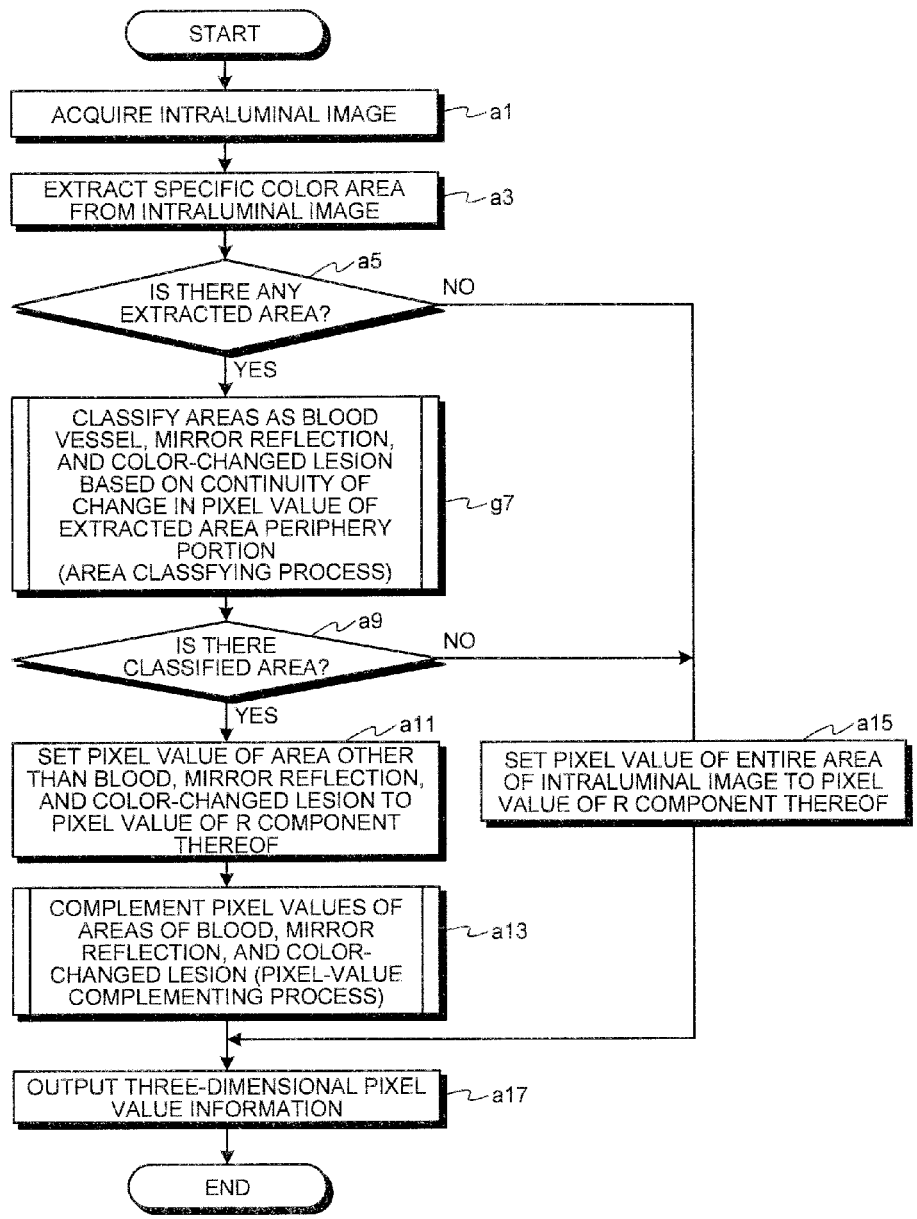
FIG. 20 is the whole flowchart illustrating the processing sequence performed by an image processing apparatus according to the third embodiment.

Next, the detailed processing sequence performed by the image processing apparatus 10b according to the third embodiment will be described. FIG. 20 is an entire flowchart illustrating the processing sequence performed by the image processing apparatus 10b according to the third embodiment. The process described here is realized by executing the image processing program 31b recorded in the recording unit 30b by using the calculation unit 20b. In FIG. 20, the same reference numeral is assigned to the same processing sequence as that of the first embodiment.

According to the third embodiment, in a case where the calculation unit 20b determines that there is an area extracted as an area of a specific color (classification target candidate area) in Step a5 (Yes in Step a5), the area classifying unit 22b classifies areas of a blood vessel, a mirror reflection portion, and a color-changed lesion, which are the classification target areas, out of the classification-target candidate areas based on the continuity of the change in the pixel value of the periphery portions of the classification target candidate area by performing an area classifying process (Step g7). As described in the first embodiment, there is a possibility that a difference in a level of a mucous membrane, a mucous membrane groove, or the like other than the blood vessel, the mirror reflection portion, and the color-changed lesion is included in the area of the specific color that is extracted based on the color feature data in Step a3. Thus, in the area classifying process according to the third embodiment, both areas are classified by determining the continuity of the change in the pixel value of the periphery portions of the area based on the curved shape of the periphery portions of the classification-target candidate area that is represented by the pixel values of the periphery portions of the classification-target candidate area.

In addition, before the classification, pixels having the same pixel value within the candidate area image are connected to each other through a labeling process, which is similar to that of the first embodiment.

Figure 21A:
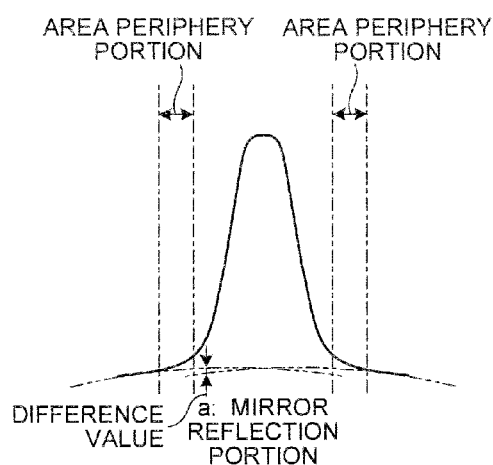
FIG. 21A is a schematic diagram illustrating a change in the pixel value in the area periphery portion of the mirror reflection portion along cross-section direction a illustrated in FIG. 5.
Figure 21D:
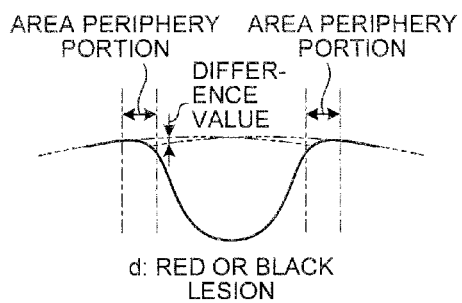
FIG. 21D is a schematic diagram illustrating a change in the pixel value in the area periphery portion of the red or black lesion along cross-section direction d illustrated in FIG. 5.
Figure 21B:
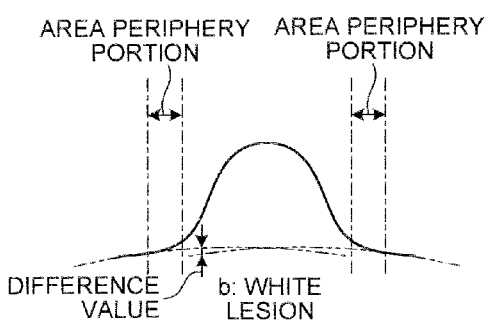
FIG. 21B is a schematic diagram illustrating a change in the pixel value in the area periphery portion of the white lesion along cross-section direction b illustrated in FIG. 5.
Figure 21E:
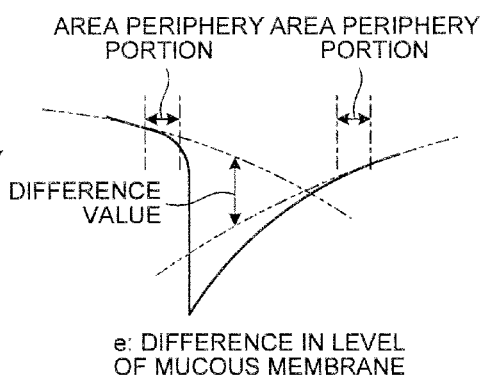
FIG. 21E is a schematic diagram illustrating a change in the pixel value in the area periphery portion of the difference in level of the mucous membrane along cross-section direction e illustrated in FIG. 5.
Figure 21C:
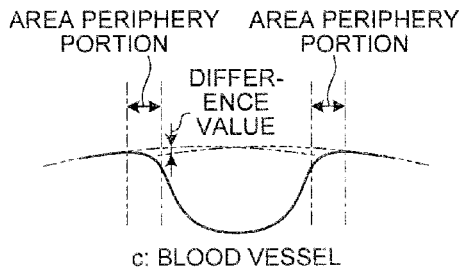
FIG. 21C is a schematic diagram illustrating a change in the pixel value in the area periphery portion of the blood vessel along the cross-section direction c illustrated in FIG. 5.
Figure 21F:
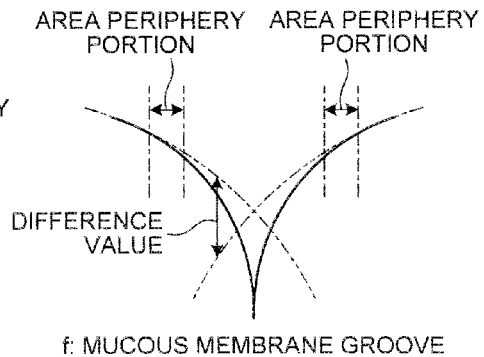
FIG. 21F is a schematic diagram illustrating a change in the pixel value in the area periphery portion of the mucous membrane groove along cross-section direction f illustrated in FIG. 5.

Here, before the detailed processing sequence of the area classifying process is described, the features of the area periphery portions of each category area of a blood vessel, a mirror reflection portion, a color-changed lesion, a difference in level of a mucous membrane, and a mucous membrane groove included in the area of the specific color will be described. FIG. 21A is a schematic diagram illustrating a change in the pixel value in the area periphery portion of the mirror reflection portion 3 along cross-section direction a illustrated in FIG. 5 referred to in the first embodiment. FIG. 21B is a schematic diagram illustrating a change in the pixel value of the area periphery portion along cross-section direction b in a case where the color-changed lesion 5 illustrated in FIG. 5 is a white lesion. FIG. 21C is a schematic diagram illustrating a change in the pixel value in the area periphery portion of the blood vessel 2 along the cross-section direction c illustrated in FIG. 5. FIG. 21D is a schematic diagram illustrating a change in the pixel value of the area periphery portion along cross-section direction d in a case where the color-changed lesion 5 illustrated in FIG. 5 is a red or black lesion. FIG. 21E is a schematic diagram illustrating a change in the pixel value of the area periphery portion along cross-section direction e in a case where the mucous membrane undulation 7 illustrated in FIG. 5 is a difference in level in a mucous membrane. FIG. 21F is a schematic diagram illustrating a change in the pixel value of the area periphery portion along cross-section direction f in a case where the mucous membrane undulation 7 illustrated in FIG. 5 is a mucous membrane groove. In FIGS. 21A, 21B, 21C, 21D, 21E, and 21F, approximated curved faces that approximate the curved shapes of two area periphery portions, which oppose each other, of a corresponding category area are denoted by dashed-two dotted lines.

As described in the first embodiment, the pixel values of the intraluminal image are composed of values of the components R, G, and B. Although there are differences in the scale between the values, the tendencies of the changes are similar to each other. Here, the mirror reflection portion 3 along cross-section direction a illustrated in FIG. 5, a color-changed lesion 5 such as a white lesion, a red lesion, or a black lesion along cross-section directions b and d, and a blood vessel 2 along cross-section direction c are continuous in the shapes, as illustrated in FIGS. 21A, 21B, 21C, 21D and have continuity in the change in the pixel value between area periphery portions. Thus, when the function formulas of the approximated curve faces acquired by approximate the curved shapes of the area periphery portions, which are represented by the pixel values of the area periphery portions, that are continuous as above are acquired, a difference value of the pixel values at the same coordinates is small. On the other hand, since the difference in level of the mucous membrane undulation 7 such as a difference in level of a mucous membrane or a mucous membrane groove along cross-section directions e and f illustrated in FIG. 5 is not continuous in the shape, there is no continuity in the change in the pixel value between the area periphery portions, as illustrated in FIGS. 21E and 21F. When the function formulas of the approximated curved faces acquired by approximate the curved shapes of the periphery portions that are represented by the pixels values of the area periphery portions that do not have continuity are acquired, a difference between pixel values at the same coordinates is large. In the area classifying process according to the third embodiment, the areas of a blood, a mirror reflection portion, and a color-changed area, which are the classification target areas, out of the classification target candidate areas are classified based on such features.

Figure 22:
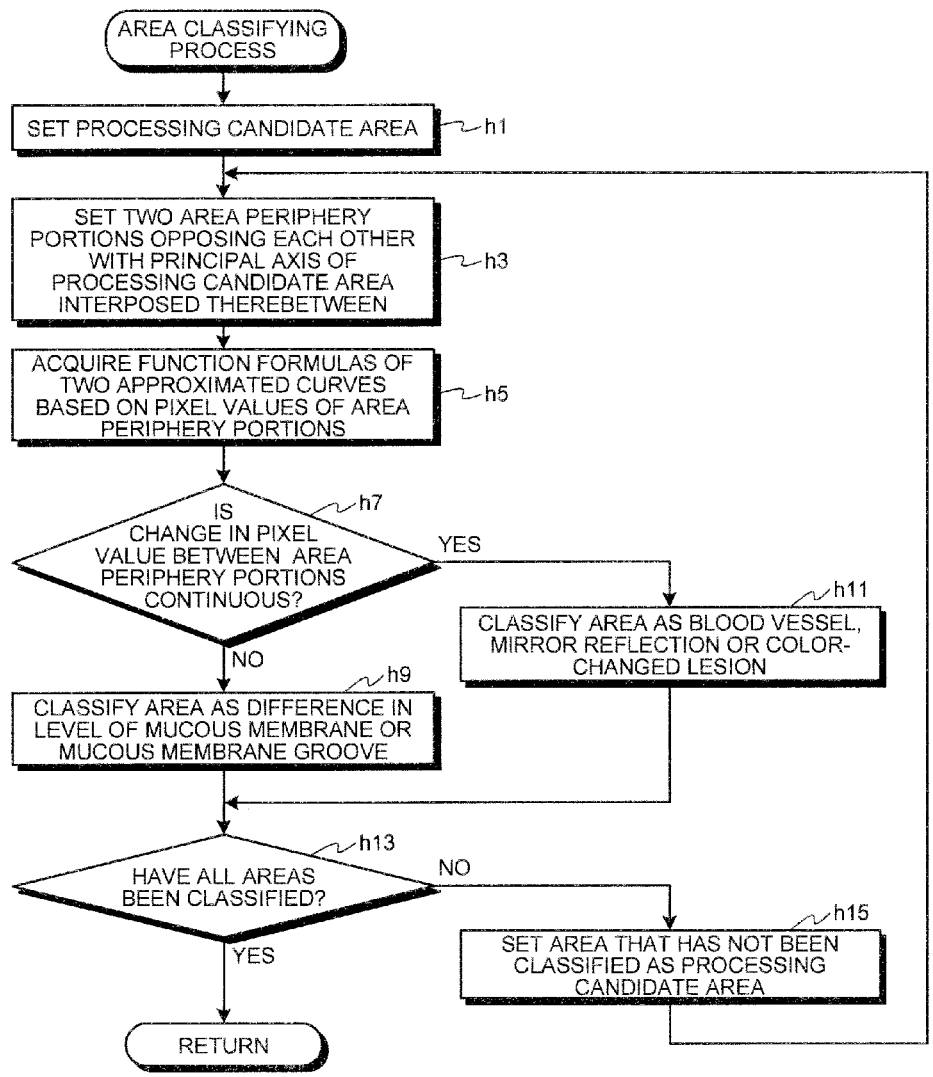
FIG. 22 is a flowchart illustrating the detailed processing sequence of an area classifying process according to the third embodiment.

FIG. 22 is a flowchart illustrating the detailed processing sequence of the area classifying process according to the third embodiment. In the area classifying process, as illustrated in FIG. 22, first, the area classifying unit 22b sets a classification-target candidate area (processing candidate area) as a processing target (Step h1).

Next, the periphery area function approximation unit 226b sets two area periphery portions opposing each other with a principal axis of the area interposed therebetween (Step h3). This can be set by dividing the remaining pixels based on a difference between a result of performing a known expansion process $N_1$ times (here, $N_1$ is a predetermined value) for the process candidate areas and a result of performing the expansion process $N_2$ times (here, $N_2$ is a predetermined value that is $N_1$ or less) into two with a principal axis (reference: "Digital Image Processing", CG-ARTS Society, 183P, *Principal Axis*) as shape feature data of the area. Then, function formulas of two approximated curved faces are acquired based on the pixel values of the inside of the area periphery area (Step h5). The method of acquiring the function formula of the approximated curved face is the same as that of the second embodiment that has been described in Step f5 illustrated in FIG. 18.

Next, the periphery continuity determining unit 227b determines whether the change in the pixel value of the two area periphery portions is continuous. As the detailed processing sequence, first, the pixel values of the inside of the processing candidate area are calculated for each function formula of two approximated curved faces by using the same method as that described in Step f7 illustrated in FIG. 18 in the second embodiment. Next, a sum of absolute values of the pixel values at the same coordinates inside the processing candidate areas calculated for each function formula is acquired. Thereafter, by determining whether or not the acquired value is a predetermined threshold value or less, it is determined whether or not the change in the pixel value between the area periphery portions is continuous. Then, in a case where the change in the pixel value between the two area periphery portions is determined not to be continuous (No in Step h7), the processing candidate area is classified as a difference in level of a mucous membrane or a mucous membrane groove (Step h9). On the other hand, in a case where the change in the pixel value is determined to be continuous (Yes in Step h7), the processing candidate area is classified as a blood vessel, a mirror reflection portion, or a color-changed lesion (Step h11).

Thereafter, the area classifying unit 22b determines whether all the classification-target candidate areas have been classified. In a case where all the classification-target candidate areas have not been classified (No in Step h13), the area classifying unit 22b sets a classification-target candidate area that has not been classified as the processing candidate area (Step h15) and performs the process of Steps h3 to h13 again. On the other hand, in a case where all the classification-target candidate areas have been classified (Yes in Step h13), the process is returned to Step g7 illustrated in FIG. 20 and proceeds to Step a9. Consequently, a classification-target area image is generated in which positive values (label values) used for identifying areas are set to the pixels of the areas classified as the blood vessel, the mirror reflection portion, and the color-changed lesion as the classification target areas, and "0" is set to pixels of areas other than the classification target areas.

As described above, according to the third embodiment, the areas of the blood, the mirror reflection portion, and the color-changed lesion that are strongly influenced by light absorption or mirror reflection are classified out of the classification-target candidate areas as the classification target areas based on the continuity of the curved shape that is represented by the pixel values of the periphery portions of the classification target candidate areas. Accordingly, the same advantages as those of the first embodiment or the second embodiment can be acquired and thus it is possible to specify an area in which the pixel values do not correspond to the three-dimensional image from the intraluminal image. Then, three-dimensional pixel values that appropriately represent a three-dimensional shape of the body tissue in the entire area of the intraluminal image can be calculated and be output as the three-dimensional pixel value information.

Furthermore, the image processing apparatus 10 according to the first embodiment, the image processing apparatus 10a according to the second embodiment, and the image processing apparatus 10b according to the third embodiment described above can be realized by executing a program prepared in advance by using a computer system such as a personal computer or a workstation. Hereinafter, a computer system that has the same functions as those of the image processing apparatuses 10, 10a, and 10b described in the first to third embodiments and executes the image processing programs 31, 31a, and 31b will be described.

Figure 23:
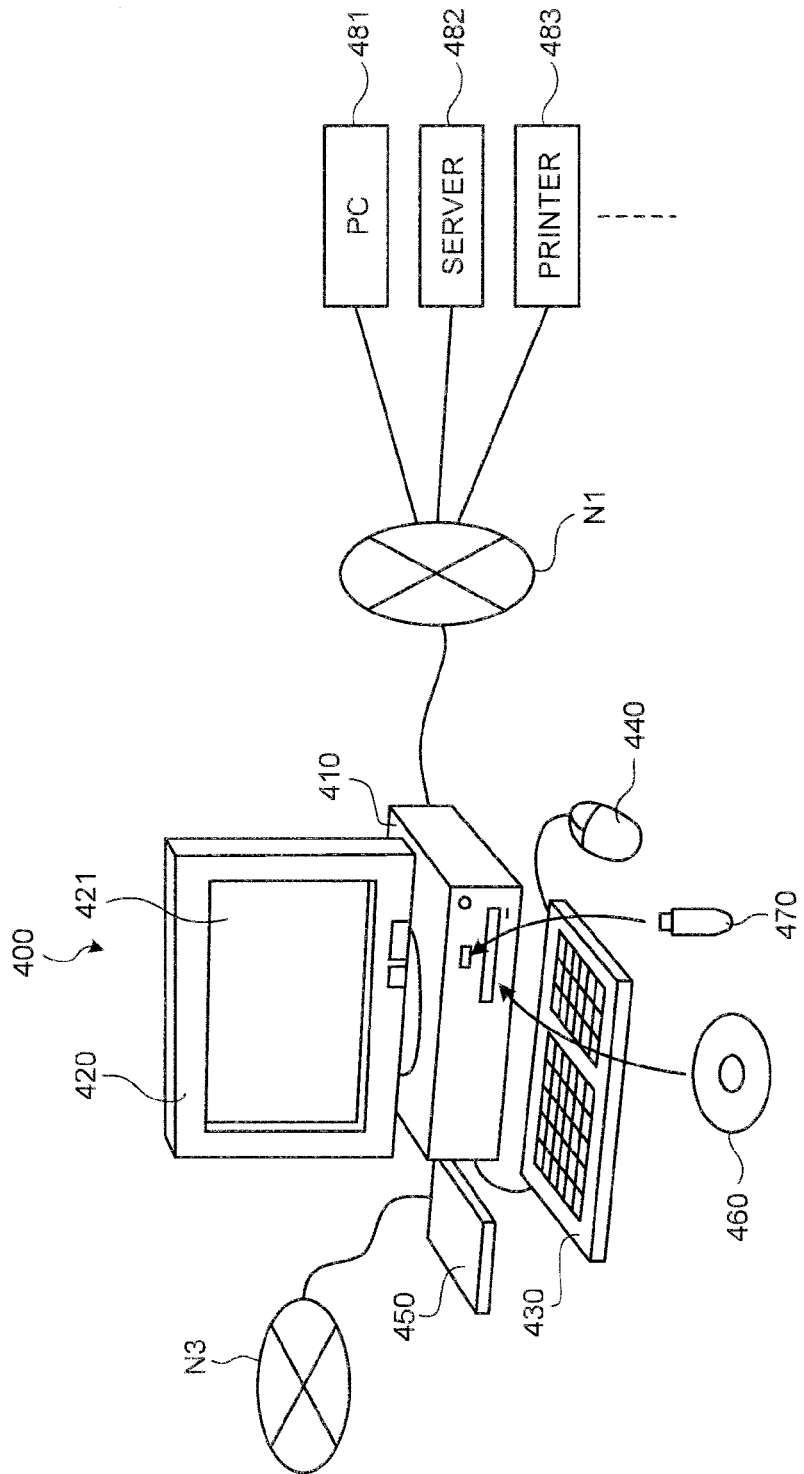
FIG. 23 is a system configuration diagram illustrating the configuration of a computer system according to an embodiment of the present invention.
Figure 24:
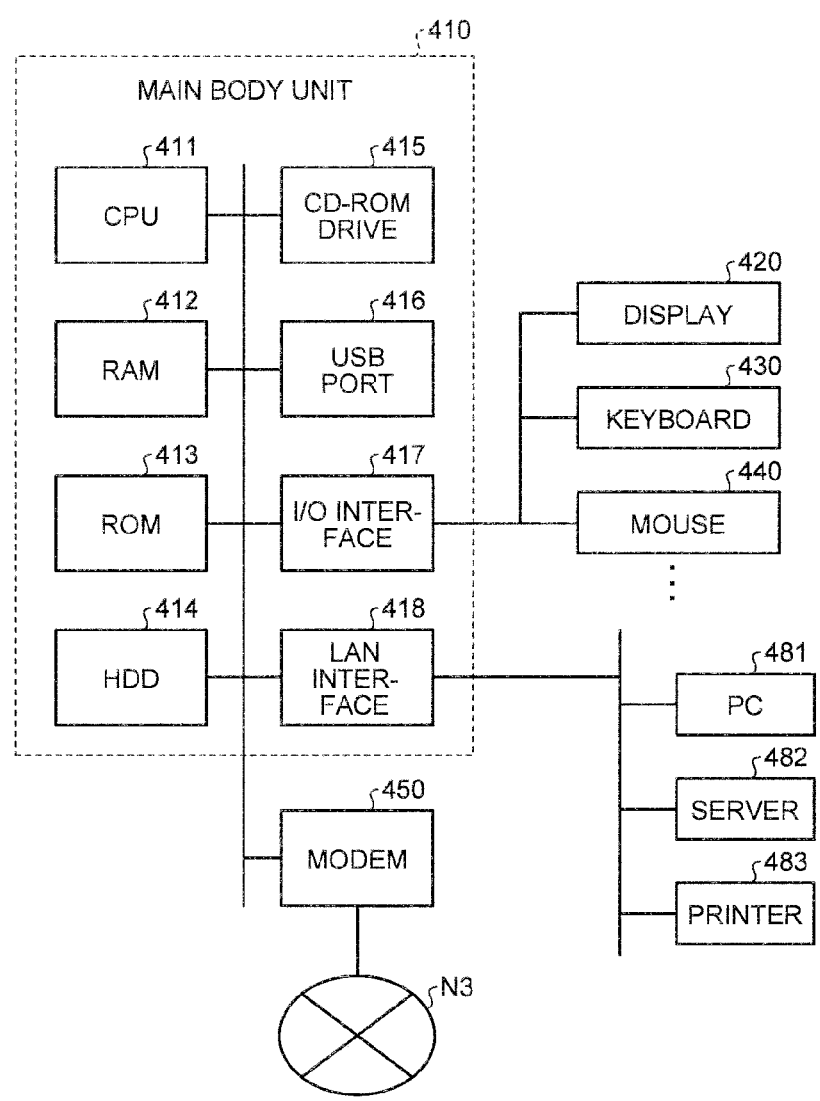
FIG. 24 is a block diagram illustrating the configuration of a main unit configuring the computer system illustrated in FIG. 23.

FIG. 23 is a system configuration diagram illustrating the configuration of a computer system 400 according to this modified example, and FIG. 24 is a block diagram illustrating the configuration of a main body unit 410 that configures the computer system 400. As illustrated in FIG. 23, the computer system 400 includes: the main body unit 410; a display 420 that is used for displaying information such as an image on a display screen 421 in accordance with an instruction transmitted from the main body unit 410; a keyboard 430 that is used for inputting various types of information to the computer system 400; and a mouse 440 that is used for designating an arbitrary position on the display screen 421 of the display 420.

In addition, the main body unit 410 of this computer system 400, as illustrated in FIGS. 23 and 24, includes: a CPU 411; a RAM 412; a ROM 413; a hard disk drive (HDD) 414; a CD-ROM drive 415 that accepts a CD-ROM 460; a USB port 416 to which a USB memory 470 can be detachably connected; an I/O interface 417 that connects the display 420, the keyboard 430, and the mouse 440 together; and a LAN interface 418 that is used for being connected to a local area network or a wide area network (LAN/WAN) N1.

Furthermore, to this computer system 400, a modem 450 that is used for being connected to a public circuit N3 such as the Internet and a personal computer (PC) 481 as another computer system, a server 482, a printer 483, and the like are connected through the LAN interface 418 and the local network or the wide area network N1.

This computer system 400 realizes the image processing apparatus (for example, the image processing apparatus 10 according to the first embodiment, the image processing apparatus 10a according to the second embodiment, or the image processing apparatus 10b according to the third embodiment) by reading out and executing an image processing program (for example, the image processing program 31 according to the first embodiment, the image processing program 31a according to the second embodiment, or the image processing program 31b according to the third embodiment) stored on a recording medium. Here, the recording media includes all types of recording media on which an image processing program is recorded so as to be readable by using the computer system 400 such as "portable-type physical media" including an MO disc, a DVD disc, a flexible disc, (FD), an IC card, and the like in addition to the CD-ROM 460 and the USB memory 470, "fixed-type physical media" including the HDD 414, the RAM 412, the ROM 413, and the like that can be internally or externally included in the computer system 400, and "communication media" such as a public circuit N3 that is connected through the modem 450, a local area network or a wide area network N1 to which the PC 481 as another computer system or the server 482 is connected, and the like that store a program for a short time when the program is transmitted.

In other words, the image processing program is recorded on a recording medium such as a "portable-type physical medium", a "fixed-type physical medium", or a "communication medium" in a computer-readable form, and the image processing apparatus is realized by reading out the image processing program from such a recording medium and executing the image processing program by using the computer system 400. In addition, the image processing program is not limited as being executed by the computer system 400, and the present invention can be similarly applied to a case where the PC 481 as another computer system or the sever 482 executes the image processing program or a case where the PC 481 and the sever 482 cooperatively execute the image processing program.

In addition, in each embodiment described above, the image processing apparatus that is built in an endoscope and processes an intraluminal image that is imaged by the endoscope has been described. However, the intraluminal image as a processing target of the image processing apparatus according to the present invention is not limited to an image that is captured by the endoscope. For example, recently, an eating-type endoscope (capsule endoscope) in which an imaging device, a communication device that transmits image data imaged by the imaging device outside the body in a wireless manner, and the like are included inside a capsule-type casing is developed, and the present invention can be similarly applied even in a case where the intraluminal image imaged by the capsule endoscope is processed.

In addition, the present invention is not limited to each of the first to third embodiments described above, and various inventions can be configured by appropriately combining a plurality of constituent elements disclosed in the first to third embodiments and the modified examples. For example, a configuration may be employed in which several constituent elements are excluded from all the constituent elements illustrated in each embodiment. Alternatively, the constituent elements illustrated in different embodiments may be appropriately combined. As a concrete example, an image processing apparatus may be configured by appropriately selecting and combining the area extracting unit 21, the area classifying unit 22, the pixel-value calculating unit 23, and the pixel-value complementing unit 24 according to the first embodiment, the area extracting unit 21a, the area classifying unit 22a, the pixel-value calculating unit 23a, and the pixel-value complementing unit 24a according to the second embodiment, and the area classifying unit 22b according to the third embodiment, as the area extracting unit, the area classifying unit, the pixel-value calculating unit, and the pixel-value complementing unit.

According to the present invention described above, an area of an intraluminal image in which the pixel value does not correspond to a three-dimensional shape can be specified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a processor; and
a memory storing computer-readable instructions that, when executed by the processor, implement:
an area extracting unit that extracts a candidate area of a classification target area in which a pixel value does not correspond to a three-dimensional shape of an imaging target based on pixel values of an intraluminal image acquired by imaging the inside of a lumen or information of a change in pixel values of peripheral pixels; and
an area classifying unit that classifies the candidate area as the classification target area based on the pixel values of the inside of the candidate area, a boundary portion of the candidate area, or a periphery portion of the candidate area.

2. The image processing apparatus according to claim 1, wherein the area classifying unit classifies the candidate area as the classification target area based on unevenness information and smoothness of a curved shape of the candidate area that is represented by the pixel values of the inside of the candidate area.

3. The image processing apparatus according to claim 2, wherein the area classifying unit includes:
a second derivative calculating unit that calculates a second derivative value by applying a second derivative filter to the pixels of the inside of the candidate area that is extracted by the area extracting unit;
an internal unevenness determining unit that determines unevenness of the curved shape of the candidate area that is represented by the pixel values of the inside of the candidate area based on a sign of the second derivative value of the pixels of the inside of the candidate area; and
an internal smoothness determining unit that determines smoothness of the curved shape of the candidate area that is represented by the pixel values of the inside based on an absolute value of the second derivative value of the pixels of the inside of the candidate area,
wherein the candidate area is classified as the classification target area based on determination results of the internal unevenness determining unit and the internal smoothness determining unit.

4. The image processing apparatus according to claim 1, wherein the area classifying unit classifies the candidate area as the classification target area based on steepness of the change in the pixel values of the boundary portion of the candidate area.

5. The image processing apparatus according to claim 4, wherein the area classifying unit includes:
a first derivative calculating unit that calculates a first derivative value by applying a first derivative filter to the pixels of the boundary portion of the candidate area; and
a boundary steepness determining unit that determines steepness of the change in the pixel value of the boundary portion of the candidate area based on the first derivative value of the pixels of the boundary portion of the candidate area,
wherein the candidate area is classified as the classification target area based on a determination result of the boundary steepness determining unit.

6. The image processing apparatus according to claim 1, wherein the area classifying unit classifies the candidate area as the classification target area based on continuity of a curved shape that is represented by the pixel values of the periphery portion of the candidate area.

7. The image processing apparatus according to claim 6, wherein the area classifying unit includes:
a periphery area function approximation unit that performs function approximation of the curved shape of the candidate area that is represented by the pixel values of at least two area periphery portions opposing each other with the candidate area interposed therebetween; and
a periphery continuity determining unit that determines continuity of the two area periphery portions by comparing results of the function approximation of the two area periphery portions,
wherein the candidate area is classified as the classification target area based on a determination result of the periphery continuity determining unit.

8. The image processing apparatus according to claim 1, wherein the computer-readable instructions, when executed by the processor, further implement a pixel-value complementing unit that complements the pixel values of the classification target area based on the pixel values of an area other than the classification target area.

9. The image processing apparatus according to claim 8, wherein the computer-readable instructions, when executed by the processor, further implement a pixel-value calculating unit that calculates a pixel value of a specific wavelength component that is specified in accordance with the degree of absorption or scattering inside a body, in an area other than the classification target area,
wherein the pixel-value complementing unit complements the pixel values of the classification target area based on the pixel values of the specific wavelength component that are calculated by the pixel-value calculating unit.

10. The image processing apparatus according to claim 8, wherein the pixel-value complementing unit includes a morphology processing unit that performs morphology processing based on the pixel values of the periphery of the classification target area, and
wherein the pixel values of the classification target area are complemented based on a result of the morphology processing of the morphology processing unit.

11. The image processing apparatus according to claim 10, wherein the morphology processing unit includes a structure element generating unit that generates a structure element of the morphology processing based on feature data of the classification target area, and the morphology processing is performed by using the structure element generated by the structure element generating unit.

12. The image processing apparatus according to claim 8, wherein the pixel-value complementing unit includes a function approximation unit that performs function approximation based on the pixel values of the periphery of the classification target area, and the pixel values of the classification target area are complemented based on a result of the function approximation of the function approximation unit.

13. The image processing apparatus according to claim 12, wherein the function approximation unit includes a sample-pixel selecting unit that selects at least one sample pixel that is used for the function approximation from each of at least two periphery areas opposing each other with the classification target area interposed therebetween, and the function approximation is performed based on the sample pixel.

14. The image processing apparatus according to claim 1, wherein the computer-readable instructions, when executed by the processor, further implement a pixel-value calculating unit that calculates a pixel value of a specific-wavelength component that is specified in accordance with the degree of absorption or scattering inside a body, in an area other than the classification target area.

15. The image processing apparatus according to claim 14, wherein the intraluminal image is composed of a plurality of wavelength components, and wherein the pixel-value calculating unit includes a specific-wavelength component selecting unit that selects the specific-wavelength component out of the plurality of wavelength components or wavelength components that are acquired by converting the plurality of wavelength components.

16. The image processing apparatus according to claim 14, wherein the intraluminal image includes a plurality of wavelength components, and wherein the pixel-value calculating unit includes:
a spectroscopic information estimating unit that estimates spectroscopic information of a body tissue based on the plurality of wavelength components; and
a specific-wavelength component calculating unit that calculates a pixel value of the specific-wavelength component based on the spectroscopic information.

17. The image processing apparatus according to claim 1, wherein the area extracting unit includes a specific-color area extracting unit that extracts a specific-color area representing pixel values of a specific color as the candidate area.

18. The image processing apparatus according to claim 1, wherein the area extracting unit includes a concave area/convex area extracting unit that extracts a concave area representing a pixel value less than an average value of the pixel values of periphery pixels and a convex area representing a pixel value greater than the average value of the pixel values of the periphery pixels as the candidate area.

19. The image processing apparatus according to claim 18, wherein the concave area/convex area extracting unit includes:
a directional difference calculating unit that calculates difference values between a pixel of interest and an average value of the periphery pixels opposing each other in a predetermined direction with the pixel of interest being located at the center thereof for a plurality of directions;
a maximum value/minimum value calculating unit that calculates a maximum value and a minimum value of the difference values for the plurality of directions; and
a threshold value processing unit that performs threshold-value processing for the maximum value and the minimum value of the difference values;
wherein the concave area and the convex area are extracted based on a result of the threshold-value processing of the threshold value processing unit.

20. A method of processing an image, the method comprising:
extracting a candidate area of a classification target area in which a pixel value does not correspond to a three-dimensional shape of an imaging target based on pixel values of an intraluminal image acquired by imaging the inside of a lumen or information of a change in pixel values of peripheral pixels; and
classifying the candidate area as the classification target area based on the pixel values of the inside of the candidate area, a boundary portion of the candidate area, or a periphery portion of the candidate area.

21. A non-transitory computer-readable recording medium with an executable program stored thereon, wherein the program instructs a processor to perform:
extracting a candidate area of a classification target area in which a pixel value does not correspond to a three-dimensional shape of an imaging target based on pixel values of an intraluminal image acquired by imaging the inside of a lumen or information of a change in pixel values of peripheral pixels; and
classifying the candidate area as the classification target area based on the pixel values of the inside of the candidate area, a boundary portion of the candidate area, or a periphery portion of the candidate area.

22. An image processing apparatus comprising:
an area extracting unit that extracts a candidate area of a classification target area in which a pixel value does not correspond to a three-dimensional shape of an imaging target based on pixel values of an intraluminal image acquired by imaging the inside of a lumen or information of a change in pixel values of peripheral pixels; and
an area classifying unit that classifies the candidate area as the classification target area based on the pixel values of the inside of the candidate area, a boundary portion of the candidate area, or a periphery portion of the candidate area.

* * * * *